(12) United States Patent
Tang et al.

(10) Patent No.: US 8,179,615 B1
(45) Date of Patent: May 15, 2012

(54) IMAGE PICKUP OPTICAL LENS ASSEMBLY

(75) Inventors: Hsiang-Chi Tang, Taichung (TW);
Hsin-Hsuan Huang, Taichung (TW)

(73) Assignee: Largan Precision Co., Taichung (TW)

(*) Notice: Subject to any disclaimer, the term of this patent is extended or adjusted under 35 U.S.C. 154(b) by 0 days.

(21) Appl. No.: 13/183,000

(22) Filed: Jul. 14, 2011

(30) Foreign Application Priority Data

Jan. 7, 2011 (TW) .................. 100100734

(51) Int. Cl.
*G02B 3/02* (2006.01)
*G02B 9/60* (2006.01)

(52) U.S. Cl. ......... 359/714; 359/763; 359/764; 359/766

(58) Field of Classification Search .................. 359/714, 359/763, 764, 765, 766
See application file for complete search history.

(56) References Cited

U.S. PATENT DOCUMENTS

| | | | |
|---|---|---|---|
| 7,826,151 B2 | 11/2010 | Tsai | |
| 2003/0117722 A1 | 6/2003 | Chen | |
| 2004/0196571 A1 | 10/2004 | Shinohara | |
| 2010/0253829 A1 | 10/2010 | Shinohara | |
| 2010/0254029 A1 | 10/2010 | Shinohara | |

FOREIGN PATENT DOCUMENTS

| | | |
|---|---|---|
| JP | 2003131136 A | 5/2003 |
| JP | 2003161879 A | 6/2003 |
| JP | 2003185917 A | 7/2003 |
| JP | 2005266771 A | 9/2005 |
| JP | 2006293042 A | 10/2006 |
| TW | M313246 | 6/2007 |
| TW | M313781 | 6/2007 |
| TW | M332199 | 5/2008 |
| TW | 201022714 | 6/2010 |
| TW | 201038966 | 11/2010 |

*Primary Examiner* — Jack Dinh
(74) *Attorney, Agent, or Firm* — Wang Law Firm, Inc.; Li K. Wang

(57) ABSTRACT

An image pickup optical lens assembly, sequentially arranged from an object side to an image side along an optical axis, comprising: the first lens element with positive refractive power having a convex object-side surface, the second lens element with negative refractive power, the third lens element with refractive power, the fourth lens element with positive or negative refractive power having a concave object-side surface and a convex image-side surface with both being aspheric, and the fifth lens element with positive or negative refractive power having a convex object-side surface and a concave image-side surface with both being aspheric. Additionally, the image pickup optical lens assembly satisfies conditions related to the reduction of the total length and the sensitivity of the image pickup optical lens assembly for compact cameras and mobile phones with camera functionalities.

23 Claims, 33 Drawing Sheets

TABLE 1

(Embodiment 1)

f = 4.01 mm, Fno = 2.40, HFOV = 35.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.023 | | | | |
| 2 | Lens 1 | 2.15674 (ASP) | 0.630 | Plastic | 1.544 | 55.9 | 3.39 |
| 3 | | -11.48250 (ASP) | 0.150 | | | | |
| 4 | Lens 2 | 9.71690 (ASP) | 0.280 | Plastic | 1.634 | 23.8 | -4.71 |
| 5 | | 2.25818 (ASP) | 0.251 | | | | |
| 6 | Lens 3 | 4.84800 (ASP) | 0.658 | Plastic | 1.544 | 55.9 | 10.32 |
| 7 | | 33.71410 (ASP) | 0.429 | | | | |
| 8 | Lens 4 | -1.39134 (ASP) | 0.399 | Plastic | 1.544 | 55.9 | 5.09 |
| 9 | | -1.01946 (ASP) | 0.035 | | | | |
| 10 | Lens 5 | 3.01690 (ASP) | 0.927 | Plastic | 1.544 | 55.9 | -5.15 |
| 11 | | 1.29504 (ASP) | 0.520 | | | | |
| 12 | IR-filter | Plano | 0.300 | Glass | 1.517 | 64.2 | - |
| 13 | | Plano | 0.657 | | | | |
| 14 | Image | Plano | - | | | | |

Note: Reference wavelength is 587.6 nm. ASP stands for aspherical surfaces.

FIG. 9

TABLE 2
Aspheric Coefficients

| Surface # | 2 | 3 | 4 | 5 | 6 |
|---|---|---|---|---|---|
| k = | -4.98855E-01 | 0.000000E+00 | -1.00000E+00 | -3.58034E+00 | -1.48333E+01 |
| A4 = | -1.58194E-03 | 8.80060E-03 | -2.75722E-02 | -2.82747E-02 | -3.80357E-02 |
| A6 = | -1.79464E-02 | -1.07032E-01 | -8.62949E-02 | -2.95624E-02 | -3.64878E-02 |
| A8 = | 3.30715E-03 | 5.27576E-02 | 4.41763E-02 | 4.69352E-02 | 1.96039E-02 |
| A10 = | -2.03684E-02 | -2.27092E-02 | 3.77873E-03 | -2.83546E-02 | 3.60903E-03 |
| A12 = | | | | 9.16626E-03 | |

| Surface # | 7 | 8 | 9 | 10 | 11 |
|---|---|---|---|---|---|
| k = | -9.00000E+01 | -6.20090E+00 | -6.13804E-01 | -3.36628E+01 | -6.73062E+00 |
| A4 = | -1.24657E-03 | 5.66559E-04 | 1.24523E-01 | -1.11526E-01 | -6.12357E-02 |
| A6 = | -3.62336E-02 | -2.63856E-02 | -1.01477E-02 | 3.12663E-02 | 1.75208E-02 |
| A8 = | 5.03574E-03 | 1.13406E-02 | -7.92596E-03 | -9.07141E-03 | -4.53679E-03 |
| A10 = | -6.23058E-03 | -6.25917E-03 | 1.12580E-02 | 1.54691E-03 | 6.27653E-04 |
| A12 = | | -4.19157E-03 | | | -3.70128E-05 |

FIG. 10

TABLE 3
(Embodiment 2)
f = 3.77 mm, Fno = 2.20, HFOV = 30.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.020 | | | | |
| 2 | Lens 1 | 1.88342 (ASP) | 0.930 | Plastic | 1.543 | 56.5 | 2.90 |
| 3 | | -7.91300 (ASP) | 0.161 | | | | |
| 4 | Lens 2 | -46.10400 (ASP) | 0.300 | Plastic | 1.632 | 23.4 | -4.29 |
| 5 | | 2.89132 (ASP) | 0.228 | | | | |
| 6 | Lens 3 | -37.96360 (ASP) | 0.258 | Plastic | 1.544 | 55.9 | 12.58 |
| 7 | | -5.81530 (ASP) | 0.289 | | | | |
| 8 | Lens 4 | -1.35959 (ASP) | 0.364 | Plastic | 1.583 | 30.2 | 68.49 |
| 9 | | -1.44455 (ASP) | 0.177 | | | | |
| 10 | Lens 5 | 1.70796 (ASP) | 0.940 | Plastic | 1.530 | 55.8 | -137.38 |
| 11 | | 1.35067 (ASP) | 0.500 | | | | |
| 12 | IR-filter | Plano | 0.300 | Glass | 1.517 | 64.2 | - |
| 13 | | Plano | 0.438 | | | | |
| 14 | Image | Plano | - | | | | |

Note: Reference wavelength is 587.6 nm. ASP stands for aspherical surfaces.

FIG. 11

TABLE 4
Aspheric Coefficients

| Surface # | 2 | 3 | 4 | 5 | 6 |
|---|---|---|---|---|---|
| k = | 8.23715E-02 | 0.00000E+00 | -1.00000E+00 | 1.24588E-01 | 9.00000E+01 |
| A4 = | -7.90248E-03 | -4.40743E-02 | -7.94602E-02 | -1.65945E-02 | -8.28016E-03 |
| A6 = | -1.51210E-02 | -1.43636E-01 | -3.27388E-01 | -2.47094E-01 | -1.30832E-02 |
| A8 = | -9.17877E-04 | 1.06978E-01 | 3.70724E-01 | 2.97271E-01 | -1.14479E-02 |
| A10 = | -1.36800E-02 | -2.30420E-02 | -9.34612E-02 | -1.76076E-01 | -2.09540E-03 |
| A12 = | | | | 4.34405E-02 | |

| Surface # | 7 | 8 | 9 | 10 | 11 |
|---|---|---|---|---|---|
| k = | -8.12620E+01 | -4.96500E+00 | -1.27739E-01 | -8.15323E+00 | -3.78227E+00 |
| A4 = | -1.21740E-03 | 1.68662E-01 | 8.29330E-02 | -1.22856E-01 | -9.58062E-02 |
| A6 = | 8.62044E-05 | -2.46093E-01 | 1.93705E-02 | 3.98932E-02 | 3.94513E-02 |
| A8 = | 3.21730E-04 | 1.23935E-01 | -3.94773E-02 | -1.67193E-03 | -1.21770E-02 |
| A10 = | -4.24924E-03 | -2.23621E-02 | 2.43317E-02 | -7.14556E-04 | 2.12461E-03 |
| A12 = | | -2.03702E-02 | | | -1.62169E-04 |

FIG. 12

TABLE 5
(Embodiment 3)
f = 3.52 mm, Fno = 2.40, HFOV = 32.1 deg.

| Surface # |           | Curvature Radius | Thickness | Material | Index | Abbe # | Focal length |
|-----------|-----------|------------------|-----------|----------|-------|--------|--------------|
| 0  | Object    | Plano            | Infinity  |          |       |        |              |
| 1  | Ape. Stop | Plano            | 0.064     |          |       |        |              |
| 2  | Lens 1    | 2.20955 (ASP)    | 0.593     | Plastic  | 1.544 | 55.9   | 3.19         |
| 3  |           | -7.29880 (ASP)   | 0.199     |          |       |        |              |
| 4  | Lens 2    | 5.13600 (ASP)    | 0.300     | Plastic  | 1.632 | 23.4   | -5.03        |
| 5  |           | 1.91898 (ASP)    | 0.200     |          |       |        |              |
| 6  | Lens 3    | 9.22320 (ASP)    | 0.496     | Plastic  | 1.544 | 55.9   | 10.91        |
| 7  |           | -16.33060 (ASP)  | 0.338     |          |       |        |              |
| 8  | Lens 4    | -1.37430 (ASP)   | 0.429     | Plastic  | 1.530 | 55.8   | 15.96        |
| 9  |           | -1.31008 (ASP)   | 0.050     |          |       |        |              |
| 10 | Lens 5    | 1.77171 (ASP)    | 0.990     | Plastic  | 1.530 | 55.8   | -24.90       |
| 11 |           | 1.25968 (ASP)    | 0.500     |          |       |        |              |
| 12 | IR-filter | Plano            | 0.300     | Glass    | 1.517 | 64.2   | -            |
| 13 |           | Plano            | 0.383     |          |       |        |              |
| 14 | Image     | Plano            | -         |          |       |        |              |

Note: Reference wavelength is 587.6 nm. ASP stands for aspherical surfaces.

FIG. 13

TABLE 6
Aspheric Coefficients

| Surface # | 2 | 3 | 4 | 5 | 6 |
|---|---|---|---|---|---|
| k = | -8.52360E-01 | 0.00000E+00 | -1.00000E+00 | -2.19914E-01 | 4.80369E+01 |
| A4 = | -1.01156E-02 | -4.35501E-02 | -7.35645E-02 | -2.16332E-02 | -3.56513E-04 |
| A6 = | -4.85899E-02 | -1.61319E-01 | -2.98047E-01 | -2.52919E-01 | -2.39295E-03 |
| A8 = | 6.69010E-03 | 1.43170E-01 | 3.42065E-01 | 3.02772E-01 | -2.13053E-02 |
| A10 = | -4.63864E-02 | -7.86642E-02 | -1.08696E-01 | -1.71146E-01 | 7.41909E-03 |
| A12 = | | | | 3.28167E-02 | |

| Surface # | 7 | 8 | 9 | 10 | 11 |
|---|---|---|---|---|---|
| k = | 8.87499E+01 | -6.47211E+01 | -1.80746E+00 | -8.28311E+00 | -3.90265E+00 |
| A4 = | -8.96216E-03 | 1.18861E-01 | 1.06044E-01 | -1.36301E-01 | -9.42095E-02 |
| A6 = | -3.71158E-02 | -2.20992E-01 | 1.83959E-02 | 4.00567E-02 | 3.68181E-02 |
| A8 = | -2.81375E-03 | 1.10111E-01 | -3.44444E-02 | -2.63140E-03 | -1.11522E-02 |
| A10 = | -7.08123E-03 | -4.05299E-02 | 2.61525E-02 | -6.12120E-04 | 1.83469E-03 |
| A12 = | | -1.12690E-02 | | | -1.35009E-04 |

FIG. 14

TABLE 7
(Embodiment 4)
f = 3.54 mm, Fno = 2.20, HFOV = 31.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Apc. Stop | Plano | 0.048 | | | | |
| 2 | Lens 1 | 1.81873 (ASP) | 0.731 | Plastic | 1.530 | 55.8 | 2.76 |
| 3 | | -6.40120 (ASP) | 0.224 | | | | |
| 4 | Lens 2 | -6.15910 (ASP) | 0.250 | Plastic | 1.650 | 21.4 | -5.03 |
| 5 | | 7.08570 (ASP) | 0.272 | | | | |
| 6 | Lens 3 | -7.48490 (ASP) | 0.322 | Plastic | 1.514 | 56.8 | 9.49 |
| 7 | | -2.99465 (ASP) | 0.272 | | | | |
| 8 | Lens 4 | -1.01488 (ASP) | 0.449 | Plastic | 1.530 | 55.8 | -48.65 |
| 9 | | -1.21837 (ASP) | 0.050 | | | | |
| 10 | Lens 5 | 1.40083 (ASP) | 0.832 | Plastic | 1.530 | 55.8 | -61.10 |
| 11 | | 1.06650 (ASP) | 0.600 | | | | |
| 12 | IR-filter | Plano | 0.300 | Glass | 1.517 | 64.2 | - |
| 13 | | Plano | 0.340 | | | | |
| 14 | Image | Plano | - | | | | |

Note: Reference wavelength is 587.6 nm. ASP stands for aspherical surfaces.

FIG. 15

TABLE 8
Aspheric Coefficients

| Surface # | 2 | 3 | 4 | 5 | 6 |
|---|---|---|---|---|---|
| k = | -2.64334E-01 | 0.00000E+00 | -1.00000E+00 | 4.14590E+00 | 4.13470E+01 |
| A4 = | -9.96395E-03 | -6.57258E-02 | -5.43210E-02 | 3.53903E-03 | -3.61395E-03 |
| A6 = | -5.41647E-02 | -1.35447E-01 | -2.66473E-01 | -2.28158E-01 | -2.82055E-02 |
| A8 = | 5.45255E-02 | 8.81040E-02 | 3.63277E-01 | 3.17420E-01 | -5.70074E-02 |
| A10 = | -1.05745E-01 | -4.73987E-02 | -9.20171E-02 | -1.60311E-01 | 5.64489E-02 |
| A12 = | | | | 5.47620E-02 | |

| Surface # | 7 | 8 | 9 | 10 | 11 |
|---|---|---|---|---|---|
| k = | -2.54895E+01 | -6.83268E+00 | -2.52431E-01 | -8.32953E+00 | -4.17332E+00 |
| A4 = | 7.81806E-03 | 4.57119E-02 | 9.54444E-02 | -1.63990E-01 | -9.15475E-02 |
| A6 = | 1.21156E-02 | -1.26801E-01 | -4.51877E-03 | 5.91247E-02 | 3.57689E-02 |
| A8 = | 3.18663E-02 | 1.26565E-01 | -1.41436E-02 | -8.46981E-03 | -1.03157E-02 |
| A10 = | -1.77047E-02 | -3.14819E-02 | 2.65722E-02 | 8.84379E-05 | 1.58950E-03 |
| A12 = | | -1.10459E-03 | | | -1.16459E-04 |

FIG. 16

TABLE 9

(Embodiment 5)
f = 3.30 mm, Fno = 2.60, HFOV = 40.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.10618 (ASP) | 0.520 | Plastic | 1.544 | 55.9 | 2.78 |
| 2 | | -4.89900 (ASP) | 0.050 | | | | |
| 3 | Ape. Stop | Plano | 0.050 | | | | |
| 4 | Lens 2 | 3.56460 (ASP) | 0.280 | Plastic | 1.634 | 23.8 | -4.21 |
| 5 | | 1.47993 (ASP) | 0.210 | | | | |
| 6 | Lens 3 | 5.96510 (ASP) | 0.397 | Plastic | 1.544 | 55.9 | 8.62 |
| 7 | | -21.41320 (ASP) | 0.407 | | | | |
| 8 | Lens 4 | -1.14085 (ASP) | 0.345 | Plastic | 1.544 | 55.9 | 11.39 |
| 9 | | -1.06614 (ASP) | 0.038 | | | | |
| 10 | Lens 5 | 1.59006 (ASP) | 0.706 | Plastic | 1.544 | 55.9 | -12.13 |
| 11 | | 1.08087 (ASP) | 0.520 | | | | |
| 12 | IR-filter | Plano | 0.300 | Glass | 1.517 | 64.2 | - |
| 13 | | Plano | 0.449 | | | | |
| 14 | Image | Plano | - | | | | |

Note: Reference wavelength is 587.6 nm. ASP stands for aspherical surfaces.

FIG. 17

TABLE 10
Aspheric Coefficients

| Surface # | 1 | 2 | 4 | 5 | 6 |
|---|---|---|---|---|---|
| k = | -1.76388E+00 | 0.00000E+00 | -1.00000E+00 | -3.44800E+00 | -4.12527E+01 |
| A4 = | -2.03767E-02 | 3.07206E-02 | 3.06306E-03 | 1.04470E-02 | -3.68235E-02 |
| A6 = | -4.48760E-02 | -5.62800E-02 | 1.00511E-01 | 1.44426E-01 | -2.94992E-02 |
| A8 = | 1.50421E-02 | -1.85544E-02 | 8.86414E-04 | -3.17017E-02 | 1.32542E-01 |
| A10 = | -2.81783E-02 | 1.16922E-02 | -1.46352E-01 | -1.31366E-01 | -6.35919E-02 |
| A12 = | | | | 5.72204E-02 | |

| Surface # | 7 | 8 | 9 | 10 | 11 |
|---|---|---|---|---|---|
| k = | -7.99320E+01 | -9.56572E+00 | -5.54905E-01 | -1.82719E+01 | -7.16634E+00 |
| A4 = | 6.72215E-03 | -3.47275E-02 | 1.58402E-01 | -1.56647E-01 | -8.31298E-02 |
| A6 = | -9.64769E-02 | -3.52672E-03 | 7.31393E-03 | 2.39218E-02 | 2.39218E-02 |
| A8 = | 2.06512E-02 | -1.70155E-02 | 4.77308E-03 | 6.48211E-03 | -6.44900E-03 |
| A10 = | 2.01998E-02 | -1.84517E-02 | -4.63070E-05 | -1.18069E-02 | 8.59340E-04 |
| A12 = | | -3.13137E-02 | | 8.31841E-04 | -5.65007E-05 |

FIG. 18

TABLE 11
(Embodiment 6)
f = 3.99 mm, Fno = 2.40, HFOV = 34.8 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Ape. Stop | Plano | -0.096 |  |  |  |  |
| 2 | Lens 1 | 1.94480 (ASP) | 0.588 | Plastic | 1.544 | 55.9 | 2.90 |
| 3 |  | -7.40970 (ASP) | 0.109 |  |  |  |  |
| 4 | Lens 2 | 16.19880 (ASP) | 0.280 | Plastic | 1.614 | 25.6 | -3.64 |
| 5 |  | 1.95165 (ASP) | 0.274 |  |  |  |  |
| 6 | Lens 3 | 5.49730 (ASP) | 0.710 | Plastic | 1.544 | 55.9 | 5.48 |
| 7 |  | -6.22580 (ASP) | 0.522 |  |  |  |  |
| 8 | Lens 4 | -1.06612 (ASP) | 0.339 | Plastic | 1.544 | 55.9 | -151.74 |
| 9 |  | -1.20109 (ASP) | 0.035 |  |  |  |  |
| 10 | Lens 5 | 2.13280 (ASP) | 0.974 | Plastic | 1.544 | 55.9 | -13.05 |
| 11 |  | 1.37623 (ASP) | 0.520 |  |  |  |  |
| 12 | IR-filter | Plano | 0.300 | Glass | 1.517 | 64.2 | - |
| 13 |  | Plano | 0.434 |  |  |  |  |
| 14 | Image | Plano | - |  |  |  |  |

Note: Reference wavelength is 587.6 nm. ASP stands for aspherical surfaces.

FIG. 19

TABLE 12
Aspheric Coefficients

| Surface # | 2 | 3 | 4 | 5 | 6 |
|---|---|---|---|---|---|
| k = | -3.34068E-01 | 0.00000E+00 | -1.00000E+00 | -3.86421E+00 | 3.41489E+00 |
| A4 = | -9.18367E-04 | 5.10772E-02 | -1.58527E-02 | -1.27311E-02 | -2.11773E-02 |
| A6 = | 6.06687E-03 | -9.08819E-02 | -5.25344E-02 | -4.51053E-03 | -3.62534E-02 |
| A8 = | -2.75510E-02 | 7.75231E-03 | 2.06750E-02 | 6.03643E-02 | 1.79264E-02 |
| A10 = | -2.11214E-03 | -1.67692E-03 | -9.86336E-04 | -4.09728E-02 | 4.13207E-03 |
| A12 = | | | | 9.88915E-03 | |

| Surface # | 7 | 8 | 9 | 10 | 11 |
|---|---|---|---|---|---|
| k = | -7.38496E+00 | -7.67211E+00 | -4.38692E-01 | -2.95625E+01 | -6.36208E+00 |
| A4 = | 7.76275E-03 | -7.92502E-02 | 4.19930E-02 | -2.24942E-01 | -7.53979E-02 |
| A6 = | -5.78875E-02 | -3.39906E-02 | -9.67999E-03 | 8.25289E-02 | 2.41820E-02 |
| A8 = | 9.35002E-02 | 4.51575E-03 | -1.99071E-03 | -1.26027E-02 | -5.79338E-03 |
| A10 = | -1.00534E-02 | -7.56234E-03 | 8.59382E-03 | -2.36457E-03 | 6.94264E-04 |
| A12 = | | -3.11265E-03 | | | -3.74341E-05 |

FIG. 20

TABLE 13
(Embodiment 7)
f = 3.70 mm, Fno = 2.30, HFOV = 30.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.087 | | | | |
| 2 | Lens 1 | 2.00270 (ASP) | 0.851 | Plastic | 1.543 | 56.5 | 2.52 |
| 3 | | -3.66050 (ASP) | 0.247 | | | | |
| 4 | Lens 2 | -3.78140 (ASP) | 0.267 | Plastic | 1.632 | 23.4 | -3.31 |
| 5 | | 4.81860 (ASP) | 0.200 | | | | |
| 6 | Lens 3 | -31.05770 (ASP) | 0.252 | Plastic | 1.544 | 55.9 | 12.38 |
| 7 | | -5.55180 (ASP) | 0.372 | | | | |
| 8 | Lens 4 | -1.15037 (ASP) | 0.353 | Plastic | 1.583 | 30.2 | 172.26 |
| 9 | | -1.26594 (ASP) | 0.056 | | | | |
| 10 | Lens 5 | 1.55897 (ASP) | 0.963 | Plastic | 1.530 | 55.8 | 138.56 |
| 11 | | 1.25198 (ASP) | 0.550 | | | | |
| 12 | IR-filter | Plano | 0.300 | Glass | 1.517 | 64.2 | - |
| 13 | | Plano | 0.388 | | | | |
| 14 | Image | Plano | - | | | | |

Note: Reference wavelength is 587.6 nm. ASP stands for aspherical surfaces.

FIG. 21

TABLE 14
Aspheric Coefficients

| Surface # | 2 | 3 | 4 | 5 | 6 |
|---|---|---|---|---|---|
| k = | -4.95401E-01 | 0.000000E+00 | -1.000000E+00 | 4.74087E+00 | 9.00000E+01 |
| A4 = | -1.56720E-02 | -6.80760E-02 | -5.59264E-02 | 2.78914E-03 | -1.07943E-02 |
| A6 = | -5.09157E-02 | -1.20768E-01 | -2.71153E-01 | -2.45572E-01 | -1.96677E-02 |
| A8 = | 3.72929E-02 | 8.61226E-02 | 3.73421E-01 | 2.94077E-01 | -6.54713E-02 |
| A10 = | -8.75570E-02 | -3.97405E-02 | -1.02264E-01 | -1.64971E-01 | 5.98295E-02 |
| A12 = | | | | 6.38744E-02 | |

| Surface # | 7 | 8 | 9 | 10 | 11 |
|---|---|---|---|---|---|
| k = | -9.00000E+01 | -8.61072E+00 | -1.94153E-01 | -1.19762E+01 | -4.90446E+00 |
| A4 = | 3.21256E-03 | 2.89576E-02 | 8.55204E-02 | -1.58700E-01 | -8.55416E-02 |
| A6 = | 9.17955E-03 | -1.31972E-01 | -9.02842E-03 | 6.53807E-02 | 3.16563E-02 |
| A8 = | 3.66951E-02 | 1.09969E-01 | -1.01609E-02 | -9.57441E-03 | -9.56889E-03 |
| A10 = | -1.94597E-02 | -3.18846E-02 | 2.53182E-02 | 5.16227E-05 | 1.59991E-03 |
| A12 = | | 7.66129E-04 | | | -1.22329E-04 |

FIG. 22

TABLE 15
(Embodiment 8)
f = 3.69 mm, Fno = 2.20, HFOV = 30.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.099 | | | | |
| 2 | Lens 1 | 1.99392 (ASP) | 0.957 | Plastic | 1.543 | 56.5 | 2.50 |
| 3 | | -3.52690 (ASP) | 0.214 | | | | |
| 4 | Lens 2 | -3.97180 (ASP) | 0.250 | Plastic | 1.632 | 23.4 | -3.38 |
| 5 | | 4.72590 (ASP) | 0.287 | | | | |
| 6 | Lens 3 | -11.61070 (ASP) | 0.255 | Plastic | 1.514 | 56.8 | 12.33 |
| 7 | | -4.12800 (ASP) | 0.333 | | | | |
| 8 | Lens 4 | -1.14764 (ASP) | 0.388 | Plastic | 1.583 | 30.2 | -104.41 |
| 9 | | -1.31538 (ASP) | 0.050 | | | | |
| 10 | Lens 5 | 1.37738 (ASP) | 0.864 | Plastic | 1.530 | 55.8 | 47.92 |
| 11 | | 1.13993 (ASP) | 0.550 | | | | |
| 12 | IR-filter | Plano | 0.300 | Glass | 1.517 | 64.2 | - |
| 13 | | Plano | 0.386 | | | | |
| 14 | Image | Plano | - | | | | |

Note: Reference wavelength is 587.6 nm. ASP stands for aspherical surfaces.

FIG. 23

TABLE 16
Aspheric Coefficients

| Surface # | 2 | 3 | 4 | 5 | 6 |
|---|---|---|---|---|---|
| k = | -2.71791E-01 | 0.00000E+00 | -1.00000E+00 | 3.89171E+00 | 4.74273E+01 |
| A4 = | -1.14930E-02 | -5.82352E-02 | -6.13713E-02 | -1.63721E-03 | -3.12197E-03 |
| A6 = | -4.46382E-02 | -1.23552E-01 | -2.83986E-01 | -2.32188E-01 | -6.90064E-03 |
| A8 = | 4.31071E-02 | 9.31718E-02 | 3.65839E-01 | 2.91359E-01 | -7.26592E-02 |
| A10 = | -7.17053E-02 | -3.56157E-02 | -9.86008E-02 | -1.67469E-01 | 4.36963E-02 |
| A12 = | | | | 5.83842E-02 | |

| Surface # | 7 | 8 | 9 | 10 | 11 |
|---|---|---|---|---|---|
| k = | -5.86532E+01 | -9.29685E+00 | -1.80972E-01 | -9.34017E+00 | -4.27225E+00 |
| A4 = | -1.53704E-03 | 3.10479E-02 | 7.43292E-02 | -1.53082E-01 | -8.97132E-02 |
| A6 = | 1.37771E-02 | -1.25336E-01 | -6.31769E-03 | 5.66145E-02 | 3.41426E-02 |
| A8 = | 3.93514E-02 | 1.16997E-01 | -8.95230E-03 | -7.19206E-03 | -1.01143E-02 |
| A10 = | -2.23357E-02 | -3.17209E-02 | 1.98923E-02 | 1.30553E-05 | 1.64278E-03 |
| A12 = | | 3.77373E-04 | | | -1.20823E-04 |

FIG. 24

TABLE 17

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f | 4.01 | 3.77 | 3.52 | 3.54 | 3.30 | 3.99 | 3.70 | 3.69 |
| Fno | 2.40 | 2.20 | 2.40 | 2.20 | 2.60 | 2.40 | 2.30 | 2.20 |
| HFOV | 35.1 | 30.6 | 32.1 | 31.7 | 40.2 | 34.8 | 30.8 | 30.6 |
| V1-V2 | 32.1 | 33.1 | 32.5 | 34.4 | 32.1 | 30.3 | 33.1 | 33.1 |
| T12/T23 | 0.60 | 0.71 | 1.00 | 0.82 | 0.48 | 0.40 | 1.24 | 0.75 |
| CT4/CT5 | 0.43 | 0.39 | 0.43 | 0.54 | 0.49 | 0.35 | 0.37 | 0.45 |
| (R1+R2)/(R1-R2) | -0.68 | -0.62 | -0.54 | -0.56 | -0.40 | -0.58 | -0.29 | -0.28 |
| f/f1 | 1.18 | 1.30 | 1.11 | 1.28 | 1.19 | 1.38 | 1.47 | 1.48 |
| |f/f4|+|f/f5| | 1.57 | 0.08 | 0.36 | 0.13 | 0.56 | 0.33 | 0.05 | 0.11 |
| (CT4+T45)/CT5 | 0.47 | 0.58 | 0.48 | 0.60 | 0.54 | 0.38 | 0.42 | 0.51 |
| Sd/Td | 0.99 | 0.99 | 1.02 | 1.01 | 0.81 | 0.97 | 1.02 | 1.03 |
| TTL/ImgH | 1.80 | 2.14 | 2.09 | 2.03 | 1.49 | 1.75 | 2.10 | 2.11 |

FIG. 25

IMAGE PICKUP OPTICAL LENS ASSEMBLY

BACKGROUND OF THE INVENTION

1. Field of the Invention

The present invention relates to an image pickup optical lens assembly, and more particularly to an image pickup optical lens assembly comprised of five lens elements and applied to an electronic product, and the optical lens assembly has the features of a short total length and a low cost.

2. Description of the Related Art

As science and technology advance, the development of present electronic products such as digital still cameras, web cameras, mobile phone cameras tends to have a compact design. In addition, users not only require an optical lens assembly with compact design and low cost only, but also need an optical lens assembly with the features of good image correction capability, high resolution, and high quality of images.

In general, a conventional optical lens assembly of a mini electronic product comes with different designs including the two-lens, three-lens, four-lens, and five-lens design. However, if the image quality taken into consideration, the optical lens assemblies with the four-lens and five-lens designs have advantages on aberration correction and modulation transfer function (MTF), and the resolution of the five-lens design having a higher than the four-lens design is applicable for electronic products of high video quality or high pixel requirement.

In various five-lens designs, an optical lens assembly with a fixed focal length and different combinations of positive or negative refractive powers are adopted. As disclosed in Japanese Pat. Publication Nos. JP2003-131136 and JP2005-266771, a cemented doublet lens is used for shortening the total length of the optical system. As disclosed in Japanese Publication Nos. JP2003-185917 and JP2006-293042, U.S. Pat. Nos. US2004/0196571 and US2003/0117722, and R.O.C. Pat. No. TW M313781, a group of stacked lenses is adopted to achieve the wide angle effect. As disclosed in Japanese Pat. Publication No. JP2003-161879, the fourth and fifth lens elements with different refractive powers are used to constitute the optical system, but the total length is too long and inapplicable for the use of the mini electronic devices.

The optical lens assembly for electronic products such as digital still cameras, web cameras, mobile phone cameras requires a compact design, a short focal length, and a good aberration correction. In various designs of the five-lens image pickup optical system with a fixed focal length, the fourth lens element and the fifth lens element with different refractive powers and the fourth lens element or the fifth lens element having an inflection point can comply with the design requirements for a better aberration correction and avoid an excess total length. As disclosed in R.O.C. Pat. Nos. TWM313246, TW201038966, TW201022714, and TWM332199, a good aberration correction can be achieved, but the total length of the optical system still cannot meet the application requirements of mini electronic devices. As disclosed in U.S. Pat. Nos. 7,826,151, US2010/0254029, and US2010/0253829, the fourth lens element and the fifth lens element having an inflection point are used for the design of a shorter total length. In these prior arts, the fifth lens element having an inflection point is adopted to correct the aberration and distortion of images, but the refractive power from the fourth lens element to the fifth lens element cannot be enhanced easily under the limitation of a reduced total length of the image pickup optical lens assembly, such that the aberration correction of the fifth lens element still cannot meet the requirement. Therefore, the present invention provides a practical and feasible design to shorten the image pickup optical lens assembly, while using the refractive power of the five lens elements and the combination of convex and concave surfaces to improve the image quality for the application on compact electronic devices, in addition to the effect of reducing the total length of the optical lens assembly.

SUMMARY OF THE INVENTION

Therefore, it is a primary objective of the invention to provide an image pickup optical lens assembly, sequentially arranged from an object side to an image side along an optical axis, comprising: the first lens element, the second lens element, the third lens element, the fourth lens element and the fifth lens element, wherein the first lens element with positive refractive power has a convex object-side surface; the second lens element has negative refractive power; the third lens element with refractive power; the fourth lens element with refractive power has a concave object-side surface and a convex image-side surface near the optical axis, and both object-side surface and image-side surface thereof are aspheric; and the fifth lens element with positive or negative refractive power has a convex object-side surface and a concave image-side surface, and both object-side surface and image-side surface are aspheric; and the image pickup optical lens assembly satisfy the following relations:

$$0.3 < T_{12}/T_{23} < 1.8 \tag{1}$$

$$0.2 < CT_4/CT_5 < 0.9 \tag{2}$$

$$0.85 < f/f_1 < 1.55 \tag{3}$$

Wherein, $T_{12}$ is the axial distance from the image-side surface of the first lens element to the object-side surface of the second lens element, $T_{23}$ is the axial distance from the image-side surface of the second lens element to the object-side surface of the third lens element, $CT_4$ is the thickness of the fourth lens element near the optical axis, $CT_5$ is the thickness of the fifth lens element near the optical axis, f is the focal length of the image pickup optical lens assembly, and $f_1$ is the focal length of the first lens element.

The present invention further provides an image pickup optical lens assembly substantially the same as the above, wherein at least one of the object-side surface and the image-side surface of the second lens element is aspheric; at least one of the object-side surface and the image-side surface of the third lens element is aspheric; at least one of the object-side surface and the image-side surface of the fifth lens element has at least one inflection point; and a stop, which can be an aperture stop, and an image sensor are provided for capturing an image, and the stop is disposed between the first lens element and the second lens element, and the stop can be is a middle stop disposed between the first lens element and an object to be photographed, or a front stop; and the image sensor is installed at a position of an image plane after the first lens element, the second lens element, the third lens element, the fourth lens element and the fifth lens element are assembled. In addition to the relations (1), (2) and (3), one or more of the following relations are satisfied:

$$0.75 < Sd/Td < 1.2 \tag{4}$$

$$TTL/ImgH < 2.3 \tag{5}$$

Wherein, Sd is the axial distance from the stop to the image-side surface of the fifth lens element, Td is the axial distance from the object-side surface of the first lens element to the image-side surface of the fifth lens element, TTL is the axial distance from the object-side surface of the first lens element to the image plane, and ImgH is half of the diagonal length of an effective photosensitive area of the image sensor.

The present invention further provides an image pickup optical lens assembly substantially the same as describe above, wherein at least one of the object-side surface and the image-side surface of the second lens element is aspheric; the third lens element with positive refractive power has at least one of the object-side surface and the image-side surface thereof being aspheric; the fifth lens element is made of plastic, and at least one of the object-side surface and image-side surface of the fifth lens element has at least one inflection point. In addition to the relations (1), (2), (3) and (4), the optical lens assembly further satisfies one or more of the following relations:

$$\text{Preferably, } 0.39 < T_{12}/T_{23} < 1.25 \tag{6}$$

$$\text{Preferably, } 0.3 < CT_4/CT_5 < 0.7 \tag{10}$$

Wherein, $T_{12}$ is the axial distance from the image-side surface of the first lens element to the object-side surface of the second lens element, $T_{23}$ is the axial distance from the image-side surface of the second lens element to the object-side surface of the third lens element, and $CT_4$ is the thickness of the fourth lens element near the optical axis.

The present invention further provides an image pickup optical lens assembly substantially the same as described above, wherein at least one of the object-side surface and the image-side surface of the second lens element being aspheric; the third lens element with positive refractive power has at least one of the object-side surface and the image-side surface being aspheric; the fourth lens element has positive refractive power; the fifth lens element with negative refractive power is made of plastic, and at least one of the object-side surface and the image-side surface thereof has at least one inflection point. In addition to the relations (1), (2), (3), (4) and (10), the optical lens assembly further satisfies one or more of the following relations:

$$\text{Preferably, } 0.35 < CT_4/CT_5 < 0.55 \tag{12}$$

$$\text{Preferably, } 0.95 < f/f_1 < 1.40 \tag{13}$$

Wherein, $CT_4$ is the thickness of the fourth lens element near the optical axis, $T_{45}$ is the distance from the image-side surface of the fourth lens element to the object-side surface of the fifth lens element along the optical axis, $CT_5$ is the thickness of the fifth lens element near the optical axis, f is the focal length of the image pickup optical lens assembly, and $f_1$ is the focal length of the first lens element.

The present invention further provides an image pickup optical lens assembly, sequentially arranged from an object side to an image side along an optical axis, comprises: the first lens element, the second lens element, the third lens element, the fourth lens element and the fifth lens element, wherein the first lens element with positive refractive power has a convex object-side surface; the second lens element with negative refractive power has at least one of the object-side surface and the image-side surface thereof being aspheric; the third lens element with refractive power has at least one of the object-side surface and the image-side surface thereof being aspheric; the fourth lens element with refractive power has a concave object-side surface and a convex image-side surface near the optical axis, and both object-side surface and image-side surface thereof being aspheric; and the fifth lens element with refractive power has a convex object-side surface and a concave image-side surface, and both object-side surface and image-side surface thereof being aspheric, and at least one of the object-side surface and the image-side surface thereof has at least one inflection point. In addition to the relations (1), (2), (3) and (4), the image pickup optical lens assembly further satisfies the following relations:

$$\text{Preferably, } 0.39 < T_{12}/T_{23} < 1.25 \tag{6}$$

$$28.0 < v_1 - v_2 < 42 \tag{7}$$

$$|f/f_4| + |f/f_5| < 0.6 \tag{8}$$

$$-0.8 < (R_1 + R_2)/(R_1 - R_2) < -0.2 \tag{9}$$

$$\text{Preferably, } 0.9 < Sd/Td < 1.1 \tag{14}$$

Wherein, $T_{12}$ is the axial distance from the image-side surface of the first lens element to the object-side surface of the second lens element, $T_{23}$ is the axial distance from the image-side surface of the second lens element to the object-side surface of the third lens element, $v_1$ is the Abbe number of the first lens element, $v_2$ is the Abbe number of the second lens element, f is the focal length of the image pickup optical lens assembly, $f_4$ is the focal length of the fourth lens element, $f_5$ is the focal length of the fifth lens element, $R_1$ is the curvature radius of the object-side surface of the first lens element, $R_2$ is the curvature radius of the image-side surface of the first lens element, Sd is the axial distance from the stop to the image-side surface of the fifth lens element, Td is the axial distance from the object-side surface of the first lens element to the element image-side surface of the fifth lens.

Another objective of the present invention is to provide an image pickup optical lens assembly, sequentially arranged from an object side to an image side along an optical axis, comprising: the first lens element, the second lens element, the third lens element, the fourth lens element and the fifth lens element, wherein the first lens element with positive refractive power has a convex object-side surface; the second lens element has negative refractive power; the third lens element has positive refractive power; the fourth lens element assigned with refractive power has a concave object-side surface and a convex image-side surface near the optical axis, both object-side surface and image-side surface thereof being aspheric; and the fifth lens element with refractive power has a convex object-side surface and a concave image-side surface, both object-side surface and image-side surface thereof being aspheric; and the image pickup optical lens assembly satisfies the following relations:

$$0.3 < T_{12}/T_{23} < 1.8 \tag{1}$$

$$0.3 < (CT_4 + T_{45})/CT_5 < 0.7 \tag{15}$$

$$|f/f_4| + |f/f_5| < 1.8 \tag{11}$$

Wherein, $T_{12}$ is the axial distance from the image-side surface of the first lens element to the object-side surface of the second lens element, $T_{23}$ is the axial distance from the image-side surface of the second lens element to the object-side surface of the third lens element, $CT_4$ is the thickness of the fourth lens element near the optical axis, $T_{45}$ is the distance from the image-side surface of the fourth lens element to the object-side surface of the fifth lens element along the optical axis, $CT_5$ is the thickness of the fifth lens element near the optical axis, f is the focal length of the image pickup optical lens assembly, $f_4$ is the focal length of the fourth lens element, and $f_5$ is the focal length of the fifth lens element.

The present invention further provides an image pickup optical lens assembly substantially the same as described above, wherein at least one of the object-side surface and the image-side surface of the fifth lens element has at least one inflection point, and the fifth lens element is made of plastic. For different applications, one or more of the relations are satisfied in addition to the relations (1), (15), and (11):

$$0.85 < f/f_1 < 1.55 \quad (3)$$

$$0.35 < CT_4/CT_5 < 0.55 \quad (12)$$

$$|f/f_4| + |f/f_5| < 0.6 \quad (8)$$

$$-0.8 < (R_1 + R_2)/(R_1 - R_2) < -0.2 \quad (9)$$

Wherein, f is the focal length of the image pickup optical lens assembly, $f_1$ is the focal length of the first lens element, $CT_4$ is the thickness of the fourth lens element near the optical axis, $CT_5$ is the thickness of the fifth lens element near the optical axis, $f_4$ is the focal length of the fourth lens element, $f_5$ is the focal length of the fifth lens element, $R_1$ is the curvature radius of the object-side surface of the first lens element, and $R_2$ is the curvature radius of the image-side surface of the first lens element.

The present invention further provides an image pickup optical lens assembly, sequentially arranged from an object side to an image side along an optical axis, comprising: the first lens element, the second lens element, the third lens element, the fourth lens element and the fifth lens element, wherein the first lens element with positive refractive power has a convex object-side surface; the second lens element has negative refractive power; the third lens element has positive refractive power; the fourth lens element with positive refractive power has a concave object-side surface and a convex image-side surface near the optical axis, both object-side surface and image-side surface thereof being aspheric; and the fifth lens element with negative refractive power has a convex object-side surface and a concave image-side surface, both object-side surface and image-side surface thereof being aspheric, and at least one of the object-side surface and the image-side surface thereof has at least one inflection point, and the fifth lens element is made of plastic. In addition to the relations (1), (15), and (11), the optical lens assembly further satisfies one or more of the following relations:

$$\text{Preferably, } 0.39 < T_{12}/T_{23} < 1.25 \quad (6)$$

$$0.95 < f/f_1 < 1.40 \quad (13)$$

Wherein, $T_{12}$ is the axial distance from the image-side surface of the first lens element to the object-side surface of the second lens element, $T_{23}$ is the axial distance from the image-side surface of the second lens element to the object-side surface of the third lens element, f is the focal length of the image pickup optical lens assembly, and $f_1$ is the focal length of the first lens element.

With appropriate gaps formed among the first lens element, second lens element, third lens element, fourth lens element and fifth lens element along the optical axis of the present invention, good aberration correction and modulation transfer function (MTF) can be achieved and the total length of the optical lens assembly can be shortened effectively for its application as an image pickup optical lens assembly for mini electronic products.

In the image pickup optical lens assembly of the present invention, the combination of the first lens element with greater positive refractive power and the second lens element with negative refractive power constitutes a lens assembly with a greater refractive power for a better aberration correction. The third lens element and the fourth lens element can enhance the effective range of the assembled first lens element and second lens element and correct the aberration produced by the first lens element with positive refractive power and the second lens element and the color difference of the system. Similarly, for the fourth lens element and the fifth lens element, the fourth lens element adjusts the image range and the modulation transfer function (MTF), and the thicker fifth lens element enhances the range of the image edge area and corrects the aberration and color difference of the image of the fourth lens element to improve the overall resolution of the image pickup optical lens assembly, such that the aberration and distortion of the image pickup optical lens assembly can meet the high-resolution requirement. For different applications, the fourth lens element can be assigned with negative refractive power to enhance the correction of aberration and color difference of the images of the fourth lens element.

In the image pickup optical lens assembly of the present invention, the combination of the first lens element with positive refractive power, the second lens element with negative refractive power and the fourth lens element with positive refractive power can shorten the total length of the image pickup optical lens assembly effectively by the refractive power compensation of the second lens element and the fifth lens element, such that a greater range of effective pixels of the image sensor can be achieved for the same total length of the optical lens assembly. In other words, a shorter image pickup optical lens assembly can be designed within the same range of effective pixels of the image sensor.

In the image pickup optical lens assembly of the present invention, the fifth lens element is made of plastic to facilitate the manufacture and to reduce the cost.

BRIEF DESCRIPTION OF THE DRAWINGS

FIG. 9 shows Table 1 that lists optical data of the first preferred embodiment of the present invention;

FIG. 10 shows Table 2 that lists aspherical surface data of the first preferred embodiment of the present invention;

FIG. 11 shows Table 3 that lists optical data of the second preferred embodiment of the present invention;

FIG. 12 shows Table 4 that lists aspherical surface data of the second preferred embodiment of the present invention;

FIG. 13 shows Table 5 that lists optical data of the third preferred embodiment of the present invention;

FIG. 14 shows Table 6 that lists aspherical surface data of the third preferred embodiment of the present invention;

FIG. 15 shows Table 7 that lists optical data of the fourth preferred embodiment of the present invention;

FIG. 16 shows Table 8 that lists aspherical surface data of the fourth preferred embodiment of the present invention;

FIG. 17 shows Table 9 that lists optical data of the fifth preferred embodiment of the present invention;

FIG. 18 shows Table 10 that lists aspherical surface data of the fifth preferred embodiment of the present invention;

FIG. 19 shows Table 11 that lists optical data of the sixth preferred embodiment of the present invention;

FIG. 20 shows Table 12 that lists aspherical surface data of the sixth preferred embodiment of the present invention;

FIG. 21 shows Table 13 that lists optical data of the seventh preferred embodiment of the present invention;

FIG. 22 shows Table 14 that lists aspherical surface data of the seventh preferred embodiment of the present invention;

FIG. 23 shows Table 15 that lists optical data of the eighth preferred embodiment of the present invention;

FIG. 24 shows Table 16 that lists aspherical surface data of the eighth preferred embodiment of the present invention; and FIG. 25 shows Table 17 that lists data of related relations of the first to eighth preferred embodiments of the present invention.

DETAILED DESCRIPTION OF THE PREFERRED EMBODIMENTS

Figure 1A:
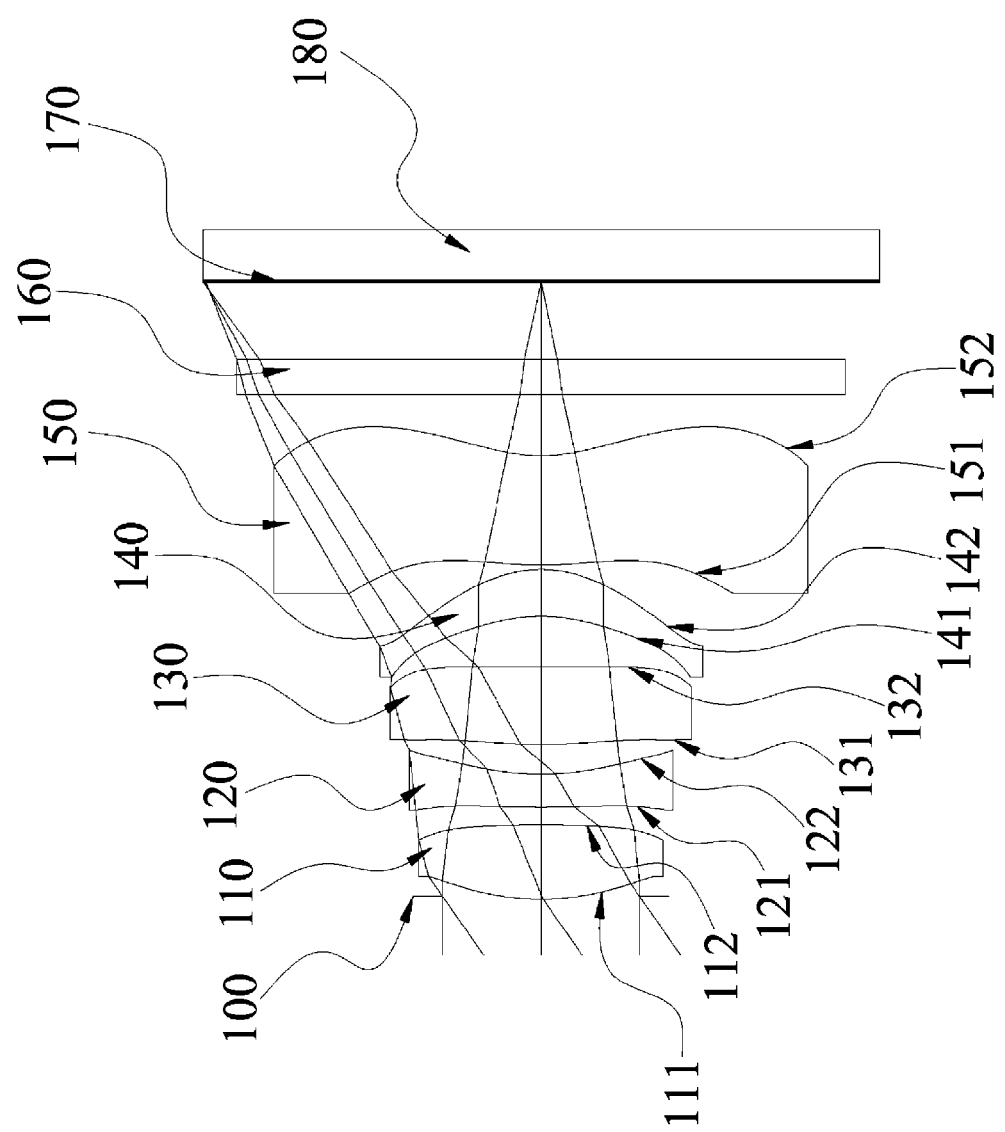
FIG. 1A is a schematic view of an image pickup optical lens assembly in accordance with the first preferred embodiment of the present invention.

The technical measures taken by the present invention to achieve the foregoing objectives and effects will become apparent with the detailed description of preferred embodiments together with related drawings as follows. It is noteworthy to point out that same numerals are used for representing same respective elements in the drawings for the purpose of illustrating the present invention.

With reference to FIG. 1A for an image pickup optical lens assembly of the present invention, the image pickup optical lens assembly, sequentially arranged from an object side to an image side along an optical axis, comprises: the first lens element (110), the second lens element (120), the third lens element (130), the fourth lens element (140) and the fifth lens element (150), wherein the first lens element (110) with positive refractive power has a convex object-side surface (111) near the optical axis, and the object-side surface (111) and an image-side surface (112) thereof being aspheric or spheric; the second lens element (120) with negative refractive power has an object-side surface (121) and an image-side surface (122) being aspheric or spheric; the third lens element (130) with refractive power, preferably positive refractive power has an object-side surface (131) and an image-side surface (132) being aspheric or spheric; the fourth lens element (140) with positive refractive power has a concave object-side surface (141) and a convex image-side surface (142) near the optical axis, both object-side surface (141) and image-side surface (142) thereof being aspheric or spheric; and the fifth lens element with refractive power has a convex object-side surface (151) and a concave image-side surface (152) near the optical axis, both object-side surface (151) and image-side surface (152) thereof being aspheric or spheric, and at least one of the object-side surface (151) and the image-side surface (152) thereof has at least one inflection point. The image pickup optical lens assembly further comprises an aperture stop (100) and an infrared filter (160), wherein the aperture stop (100) is disposed between the first lens element (110) and an object to be photographed objected to be photographed, and the infrared filter (160) is generally made of plate glass and disposed between the fifth lens element (150) and an image plane (170) without affecting the focal length of the image pickup optical lens assembly of the present invention. The image pickup optical lens assembly further comprises an image sensor (180) installed at the image plane (170). The first lens element (110), the second lens element (120), the third lens element (130), the fourth lens element (140) and the fifth lens element (150) come with aspheric optical surfaces in compliance with the aspheric surface formula as given in Equation (16):

$$X(Y) = \frac{(Y^2/R)}{1+\sqrt{(1-(1+K)(Y/R)^2)}} + \sum_i (A_i) \cdot Y^i \quad (16)$$

Wherein, X is the relative height between a point on the aspherical surface with a distance Y to the optical axis and a plane tangent to the tip of the aspherical surface along the optical axis;

Y is the distance from a point on the aspherical surface to the optical axis;

K is the conic coefficient; and $A_i$ is the $i^{th}$ level aspherical surface coefficient.

With the installation of the aforementioned first lens element (110), second lens element (120), third lens element (130), fourth lens element (140), fifth lens element (150), aperture stop (100) and image sensor (180), the image pickup optical lens assembly of the present invention satisfies relations (1), (2) and (3).

If the ratio of the thickness $T_{12}$ of the air gap between the first lens element (110) and the second lens element (120) to the thickness $T_{34}$ of the air gap between the second lens element (120) and the third lens element (130) is limited (as shown in the relation (1)), light can pass through the first lens element (110) and the air gap and enter the third lens element (130) within a specific range of refraction angle to increase the refraction angle and decrease the total length. If the ratio of the thickness of the fourth lens element (140) to the thickness of the fifth lens element (150) is decreased (as shown in the relation (2)), then the thickness of the fifth lens element (150) will be increased to provide a larger range. If the ratio of the focal length f of the image pickup optical lens assembly to the focal length $f_1$ of the first lens element (110) is limited (as shown in the relation (3)), then the focal length $f_1$ of the first lens element (110) will be increased to reduce the focal length f of the image pickup optical lens assembly and increase the refractive power of the first lens element (110) and improve the sensitivity of image pickup optical lens assembly contributed by the first lens element (110).

If Sd is the distance from the aperture stop (100) to the image-side surface of the fifth lens element (152) along the optical axis, and Td is the distance from the object-side surface of the first lens element (111) to the image-side surface of the fifth lens element (152) along the optical axis, and the relation (4) is satisfied, then the distance from the first lens element to the fifth lens element can be limited to shorten the length of the image pickup optical lens assembly. If the relation (5) is satisfied, the total length TTL of the image pickup optical lens assembly can be reduced effectively, such that a larger range of the effective pixel area of the image sensor can be achieved in the same total length. If the relation (7) is satisfied, the aberration of the first lens element (110) and the second lens element (120) can be corrected easily. If the relation (8) is satisfied, the sum of the ratio of the focal length f of the image pickup optical lens assembly to the focal length $f_4$ of the fourth lens element (140) and the ratio of the focal length f of the image pickup optical lens assembly to the focal length $f_5$ of the fifth lens element (150) is limited, such that the design of the focal length $f_4$ of the fourth lens element (140) and the focal length $f_5$ of the fifth lens element (140) can be balanced the limited conditions in order to allocate the required refractive power of the fourth lens element (140) and the fifth lens element (150) of the image pickup optical lens assembly, and prevent the sensitivity of the system from being too high, and facilitating the reduction of the total length of the lens assembly.

If the curvature radius $R_1$ of the object-side surface (111) of the first lens element (110), and the curvature radius $R_2$ of the image-side surface (112) of the first lens element 110 are limited (as shown in the relation (9)), the surface shapes of the object-side surface of first lens element (111) and the image-side surface of the first lens element (112) are changed, not only favoring the aberration correction of the first lens element (110), but also increasing the refractive power of the first lens element (110).

Figure 4A:
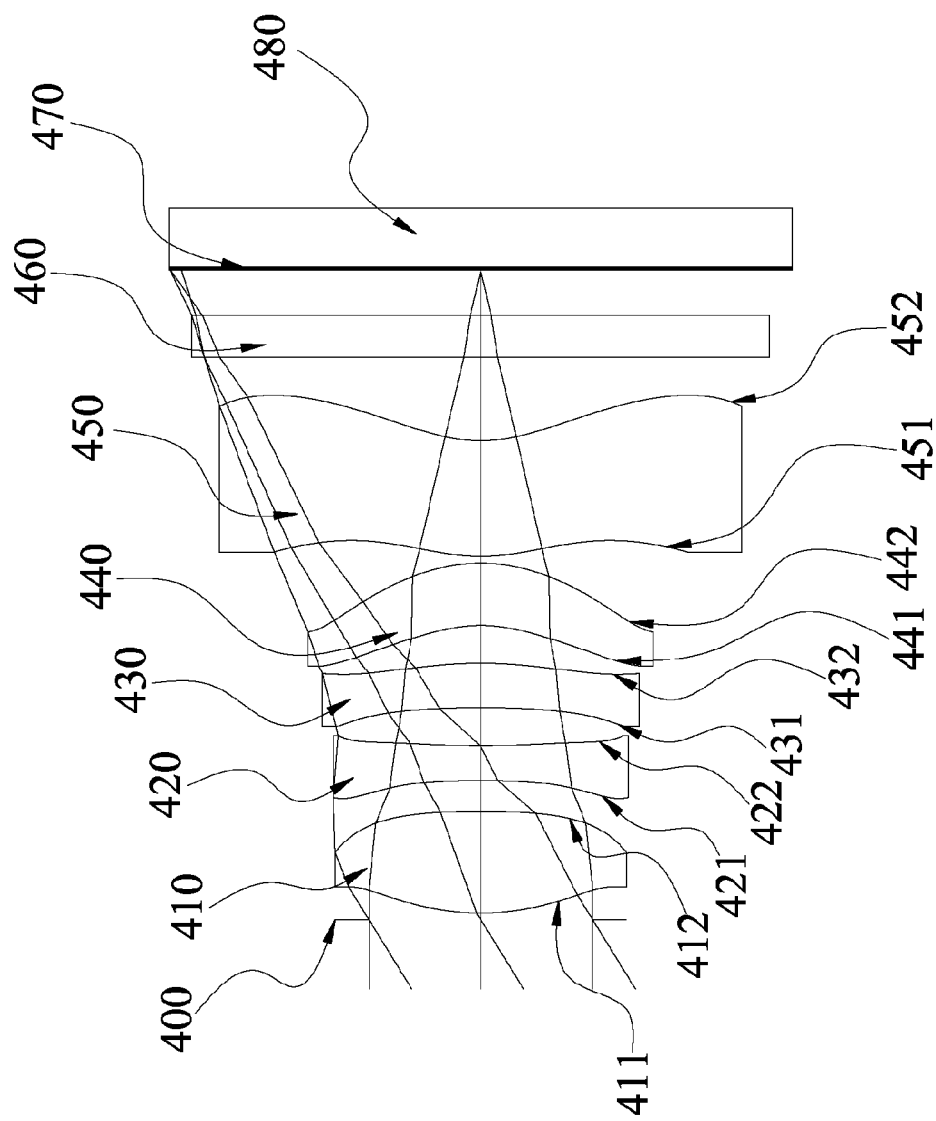
FIG. 4A is a schematic view of an image pickup optical lens assembly in accordance with the fourth preferred embodiment of the present invention.

The present invention further provides an image pickup optical lens assembly as shown in FIG. 4A, and the image pickup optical lens assembly sequentially arranged from an object side to an image side along an optical axis, comprises: the first lens element (410), the second lens element (420), the third lens element (430), the fourth lens element (440) and the fifth lens element (450), wherein the first lens element (410) with positive refractive power has a convex object-side surface (411) near the optical axis, and the object-side surface (411) and an image-side surface (412) thereof being aspheric or spheric; the second lens element (420) with negative refractive power has aspheric or spheric object-side surface (421) and image-side surface (422); the third lens element (430) with refractive power, preferably positive refractive power, has aspheric or spheric object-side surface (431) and image-side surface (432); the fourth lens element (440) with negative refractive power has a concave object-side surface (441) and a convex image-side surface (442) near the optical axis, both object-side surface (441) and image-side surface (442) thereof being aspheric or spheric; and the fifth lens element with refractive power has a convex object-side surface (451) and a concave image-side surface (452) near the optical axis, both object-side surface (451) and image-side surface (452) being aspheric or spheric, and at least one of the object-side surface (451) and image-side surface (452) thereof has at least one inflection point. The image pickup optical lens assembly further comprises an aperture stop (400) and an infrared filter (460), wherein the aperture stop (400) is disposed between the first lens element (410) and an objected to be photographed; the infrared filter (460) is generally made of plate glass and installed between the fifth lens element (450) and an image plane, without affecting the focal length of the image pickup optical lens assembly of the present invention. The image pickup optical lens assembly further comprises an image sensor (480) installed at the image plane (470) for imaging an objected to be photographed. The first lens element (410), the second lens element (420), the third lens element (430), the fourth lens element (440) and the fifth lens element (450) come with an aspheric surface in compliance with the aspherical surface formula as given in Equation (16).

With the installation of the first lens element (410), the second lens element (420), the third lens element (430), the fourth lens element (440), the fifth lens element (450), the aperture stop (400) and the image sensor (480), the image pickup optical lens assembly of the present invention satisfies one or more of the relations (1) to (15).

The image pickup optical lens assembly of the present invention is described in details by preferred embodiments and related drawings as follows.

First Preferred Embodiment

Figure 1B:
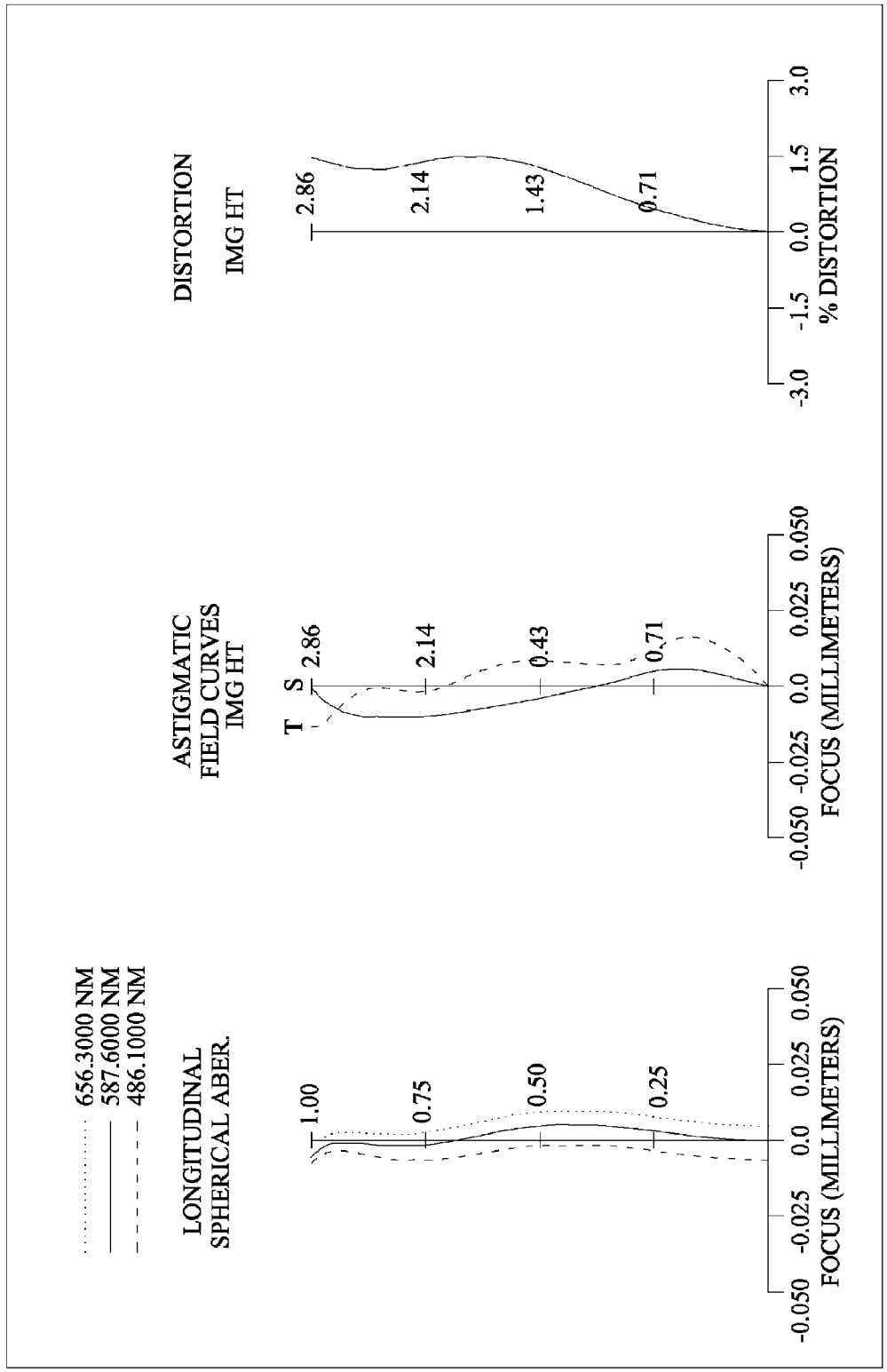
FIG. 1B is a series of aberration curves of the first preferred embodiment of the present invention.

With reference to FIGS. 1A and 1B for a schematic view of an optical system and a series of aberration curves in accordance with the first preferred embodiment of the present invention respectively, the image pickup optical lens assembly is an optical system comprising five lens elements, an infrared filter (160), an aperture stop (100) and an image sensor (180). More specifically, the image pickup optical lens assembly, sequentially arranged from an object side to an image side along an optical axis, comprises: a bi-convex first lens element (110) with positive refractive power and made of plastic, and both object-side surface (111) and image-side surface (112) thereof being aspheric; the second lens element (120) with negative refractive power, made of plastic, and having a convex object-side surface (121) and a concave image-side surface (122) near the optical axis, both object-side surface (121) and image-side surface (122) thereof being aspheric; the third lens element (130) with positive refractive power, made of plastic, and having a convex object-side surface (131) and a concave image-side surface (132) near the optical axis, both object-side surface (131) and image-side surface (132) thereof being aspheric; the fourth lens element (140) with positive refractive power, made of plastic, and having a concave object-side surface (141) and a convex image-side surface (142) near the optical axis, both object-side surface (141) and image-side surface (142) thereof being aspheric; the fifth lens element (150) with negative refractive power, made of plastic, and having a convex object-side surface (151) and a concave image-side surface (152) near the optical axis, both object-side surface (151) and image-side surface (152) thereof being aspheric, and at least one of the object-side surface (151) and the image-side surface (152) thereof having at least one inflection point; an infrared filter (IR-filter) (160) made of plate glass without affecting the focal length of the image pickup optical lens assembly of the present invention; and an image sensor (180) installed at an image plane (170). In this preferred embodiment, the image pickup optical lens assembly further comprises an aperture stop (100) disposed between the first lens element (110) and an object to be photographed.

With reference to FIG. 9 (Table 1) for the optical data of this preferred embodiment, the object-side surface of the first lens element (111), the image-side surface of the first lens element (112), the object-side surface of the second lens element (121), the image-side surface of the second lens element (122), the object-side surface of the third lens element (131), the image-side surface of the third lens element (132), the object-side surface of the fourth lens element (141), the image-side surface (142) of the fourth lens element, the object-side surface of the fifth lens element (151) and the image-side surface of the fifth lens element (152) are in compliance with the aspherical formula as shown in Equation (16) and the aspherical surface parameters are listed in FIG. 10 (Table 2).

In the image pickup optical lens assembly of the first preferred embodiment, the overall focal length of the image pickup optical lens assembly is f=4.01 (mm), the overall aperture stop value of the image pickup optical lens assembly (f-number) is Fno=2.40 and half of the maximum view angle is HFOV=35.1 (degrees).

With reference to Table 1 for the following data of this preferred embodiment, if $T_{12}$ is the distance from the image-side surface of the first lens element (112) to the object-side surface of the second lens element (121) along the optical axis, $T_{23}$ is the distance from the image-side surface of the second lens element (122) to the object-side surface of the third lens element (131) along the optical axis, $CT_4$ is the thickness of the fourth lens element (140) near the optical axis, $CT_5$ is the thickness of the fifth lens element (150) near the optical axis, f is the focal length of the image pickup optical lens assembly, and $f_1$ is the focal length of the first lens element (110), then the relations (1), (2) and (3) of $T_{12}/T_{23}$=0.60, $CT_4/CT_5$=0.43 and $f/f_1$=1.18 will be satisfied respectively.

If Td is the distance from the object-side surface of the first lens element (111) to the image-side surface of the fifth lens element (152) along optical axis, Sd is the distance from the aperture stop (100) to the image-side surface of the fifth lens element (152), then the relation (4) of Sd/Td=0.99 will be satisfied; if TTL is the distance from the object-side surface of the first lens element (111) to the image plane (170) along the optical axis, and ImgH is half of the diagonal length of the effective photosensitive area of the image sensor (180), then the relation (5) of TTL/ImgH=1.80; and if $CT_4$ is the thickness of the fourth lens element (140) and $CT_5$ is the thickness of the fifth lens element (150), and $T_{45}$ is the distance from the image-side surface of the fourth lens element (142) to the object-side surface of the fifth lens element (151), then the relation (15) of $(CT_4+T_{45})/CT_5$=0.47 will be satisfied.

In this preferred embodiment, if $v_1$ is the Abbe number of the first lens element (110) and $v_2$ is the Abbe number of the second lens element (120), then the relation (7) of $v_1-v_2$=32.1 will be satisfied; if $f_4$ is the focal length of the fourth lens element (140) and $f_5$ is the focal length of the fifth lens element (150), and f is the focal length of the image pickup optical lens assembly, then the relation (8) of $|f/f_4|+f/f_5$=1.57 will be satisfied; and if $R_1$ is the curvature radius of the object-side surface of the first lens element (111) and $R_2$ is the curvature radius of the image-side surface of the first lens element (112), then the relation (9) of $(R_1+R_2)/(R_1-R_2)$=−0.68 will be satisfied; and related computing data of the relations are listed in FIG. 25 (Table 17).

From the optical data as shown in FIG. 9 (Table 1) and the aberration curve as shown in FIG. 1B, good compensation effects of the longitudinal spherical aberration, astigmatic field curving and distortion can be achieved by the image pickup optical lens assembly in accordance with this preferred embodiment of the present invention.

Second Preferred Embodiment

Figure 2A:
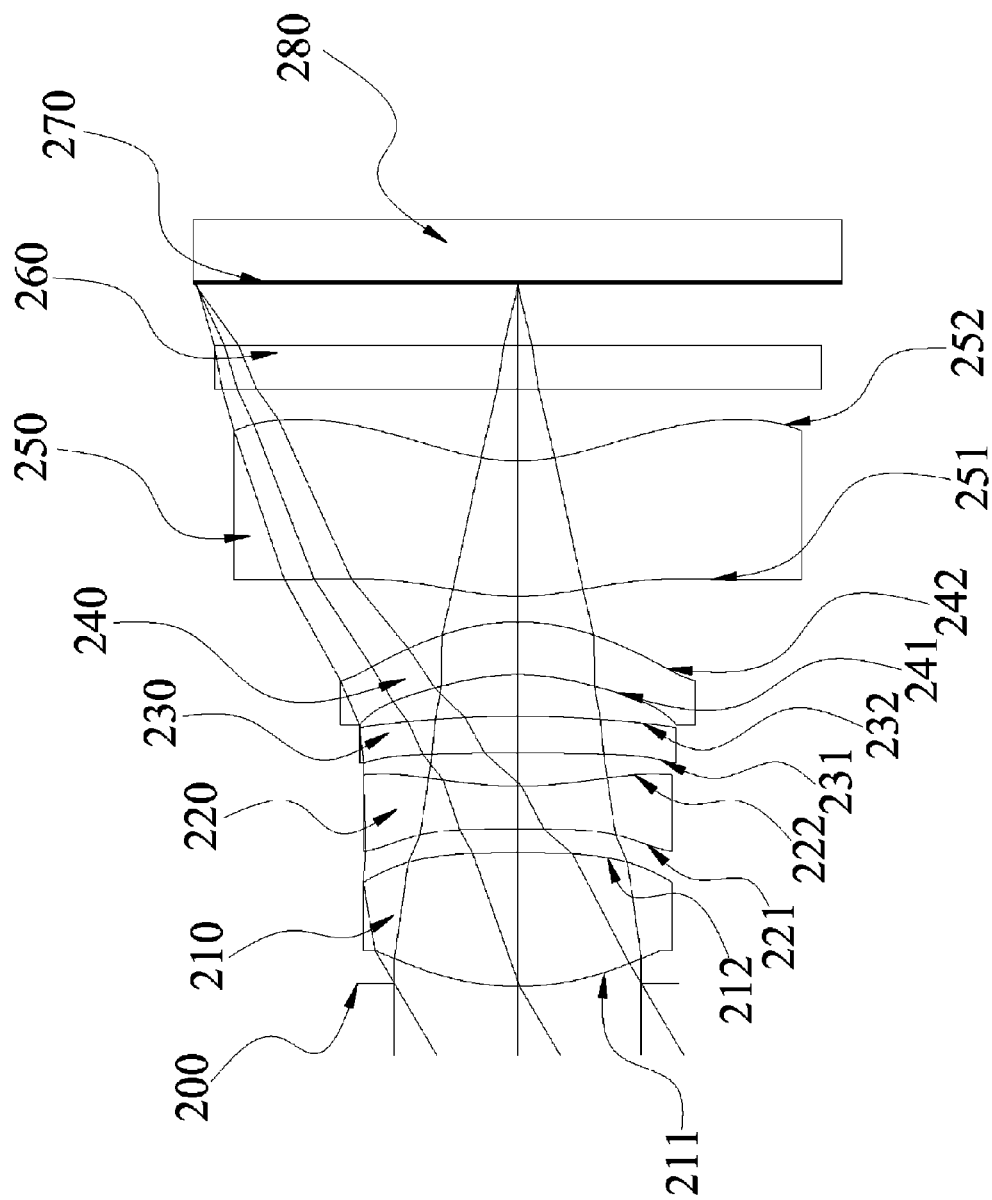
FIG. 2A is a schematic view of an image pickup optical lens assembly in accordance with the second preferred embodiment of the present invention.
Figure 2B:
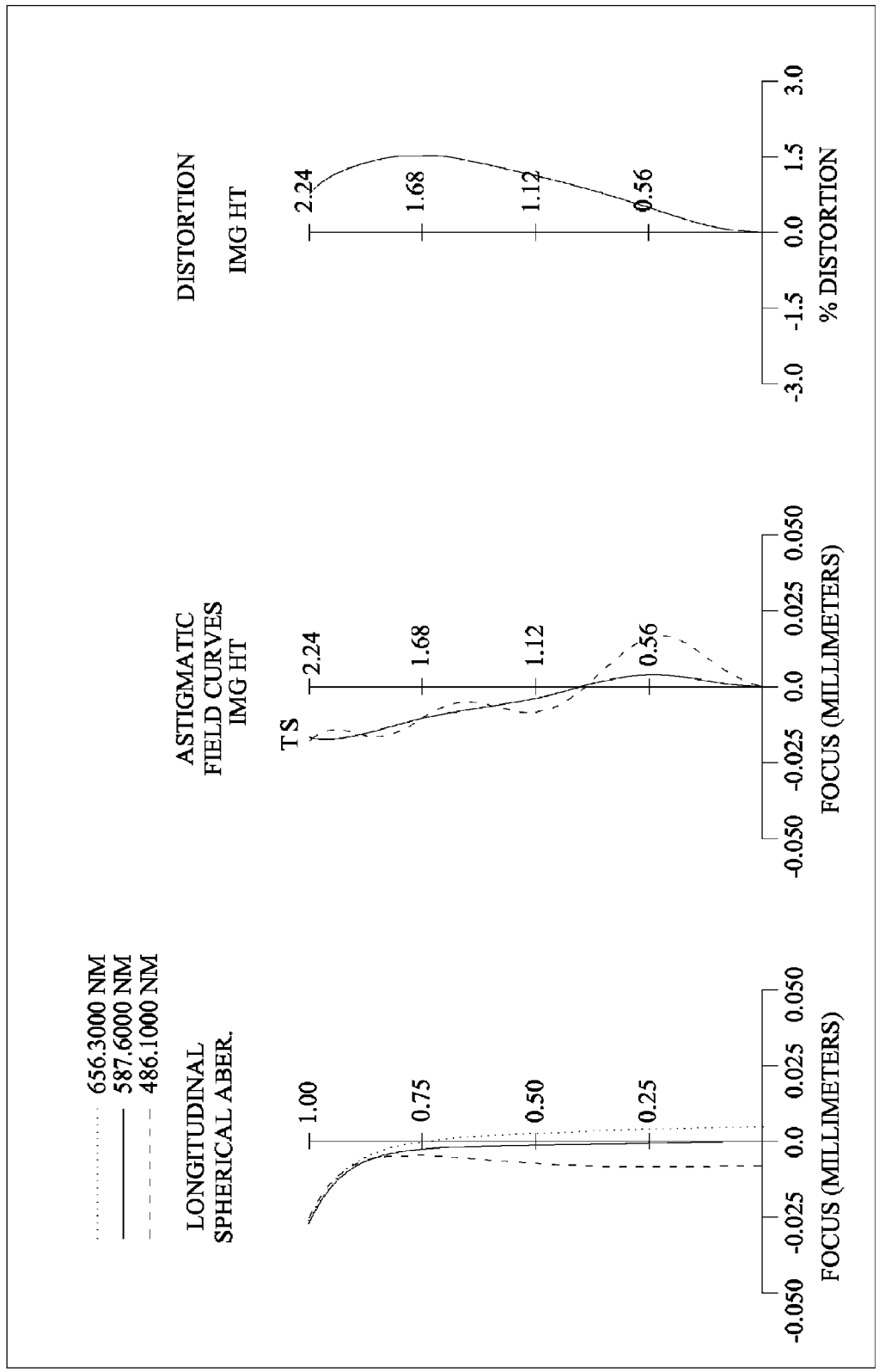
FIG. 2B is a series of aberration curves of the second preferred embodiment of the present invention.

With reference to FIGS. 2A and 2B for a schematic view of an optical system and a series of aberration curves in accordance with the first preferred embodiment of the present invention respectively, the image pickup optical lens assembly is an optical system comprising five lens elements, an infrared filter (260), an aperture stop (200) and an image sensor (280). More specifically, the image pickup optical lens assembly, sequentially arranged from an object side to an image side along an optical axis, comprises: a bi-convex first lens element (210) with positive refractive power and made of plastic, and both object-side surface (211) and image-side surface (212) thereof being aspheric; the second lens element (220) with negative refractive power, made of plastic, and having a concave object-side surface (221) and a concave image-side surface (222) near the optical axis, both object-side surface (221) and image-side surface (222) thereof being aspheric; the third lens element (230) with positive refractive power, made of plastic, and having a concave object-side surface (231) and a convex image-side surface (232) near the optical axis, both object-side surface (231) and image-side surface (232) thereof being aspheric; the fourth lens element (240) with positive refractive power, made of plastic, and having a concave object-side surface (241) and a convex image-side surface (242) near the optical axis, both object-side surface (241) and image-side surface (242) thereof being aspheric; the fifth lens element (250) with negative refractive power, made of plastic, and having a convex object-side surface (251) and a concave image-side surface (252) near the optical axis, both object-side surface (251) and image-side surface (252) thereof being aspheric, and at least one of the object-side surface (251) and the image-side surface (252) thereof having at least one inflection point; an infrared filter (IR-filter) (260) made of plate glass without affecting the focal length of the image pickup optical lens assembly of the present invention; and an image sensor (280) installed at an image plane (270). In this preferred embodiment, the image pickup optical lens assembly further comprises an aperture stop (200) disposed between the first lens element (210) and an object to be photographed.

With reference to FIG. 11 (Table 3) for the optical data of this preferred embodiment, the object-side surface of the first lens element (211), the image-side surface of the first lens element (212), the object-side surface of the second lens element (221), the image-side surface of the second lens element (222), the object-side surface of the third lens element (231), the image-side surface of the third lens element (232), the object-side surface of the fourth lens element (241), the image-side surface (242) of the fourth lens element, the object-side surface of the fifth lens element (251) and the image-side surface of the fifth lens element (252) are in compliance with the aspherical formula as shown in Equation (16) and the aspherical surface parameters are listed in FIG. 12 (Table 4).

In the image pickup optical lens assembly of the second preferred embodiment, the overall focal length of the image pickup optical lens assembly is f=3.77 (mm), the overall aperture stop value of the image pickup optical lens assembly (f-number) is Fno=2.20 and half of the maximum view angle is HFOV=30.6 (degrees).

With reference to Table 3 for the following data of this preferred embodiment, if $T_{12}$ is the distance from the image-side surface of the first lens element (212) to the object-side surface of the second lens element (221) along the optical axis, $T_{23}$ is the distance from the image-side surface of the second lens element (222) to the object-side surface of the third lens element (231) along the optical axis, $CT_4$ is the thickness of the fourth lens element (240) along the optical axis, $CT_5$ is the thickness of the fifth lens element (250) along the optical axis, f is the focal length of the image pickup optical lens assembly, and $f_1$ is the focal length of the first lens element (210), then the relations (1), (2) and (3) of $T_{12}/T_{23}$=0.71, $CT_4/CT_5$=0.39 and $f/f_1$=1.30 will be satisfied respectively.

If Td is the distance from the object-side surface of the first lens element (211) to the image-side surface of the fifth lens element (252) along optical axis, Sd is the distance from the aperture stop (200) to the image-side surface of the fifth lens element (252), then the relation (4) of Sd/Td=0.99 will be satisfied; if TTL is the distance from the object-side surface of the first lens element (211) to the image plane (270) along the optical axis, and ImgH is half of the diagonal length of the effective photosensitive area of the image sensor (280), then the relation (5) of TTL/ImgH=2.14; and if $CT_4$ is the thickness of the fourth lens element (240) and $CT_5$ is the thickness of the fifth lens element (250), and $T_{45}$ is the distance from the image-side surface of the fourth lens element (242) to the object-side surface of the fifth lens element (251), then the relation (15) of $(CT_4+T_{45})/CT_5$=0.58 will be satisfied.

In this preferred embodiment, if $v_1$ is the Abbe number of the first lens element (210) and $v_2$ is the Abbe number of the second lens element (220), then the relation (7) of $v_1-v_2$=33.1 will be satisfied; if $f_4$ is the focal length of the fourth lens element (240) and $f_5$ is the focal length of the fifth lens element (250), and f is the focal length of the image pickup optical lens assembly, then the relation (8) of $|f/f_4|+|f/f_5|$=0.08 will be satisfied; and if $R_1$ is the curvature radius of the object-side surface of the first lens element (211) and $R_2$ is the curvature radius of the image-side surface of the first lens element (212), then the relation (9) of $(R_1+R_2)/(R_1-R_2)$=−0.62 will be satisfied; and related computing data of the relations are listed in FIG. 25 (Table 17).

From the optical data as shown in FIG. 11 (Table 3) and the aberration curve as shown in FIG. 2B, good compensation effects of the longitudinal spherical aberration, astigmatic field curving and distortion can be achieved by the image pickup optical lens assembly in accordance with this preferred embodiment of the present invention.

Third Preferred Embodiment

Figure 3A:
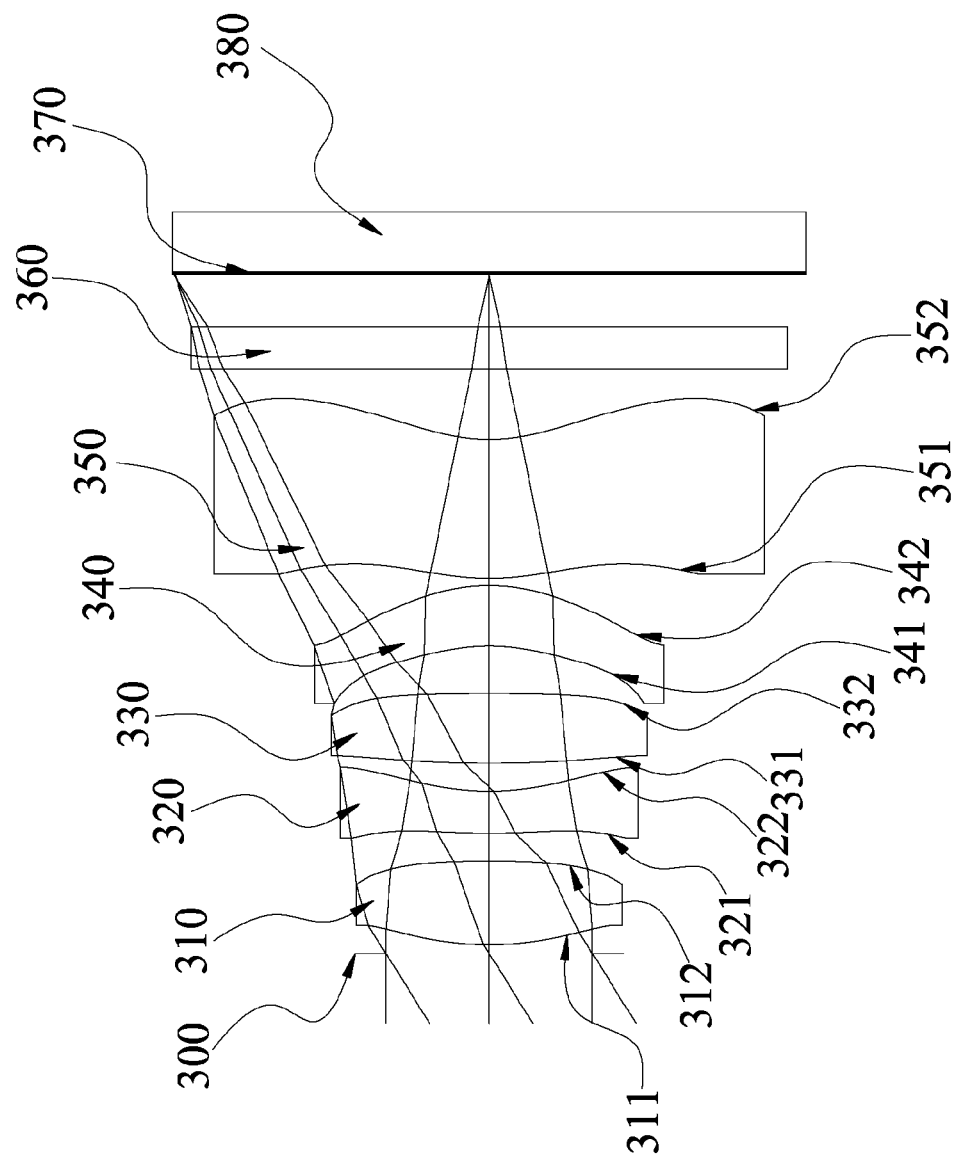
FIG. 3A is a schematic view of an image pickup optical lens assembly in accordance with the third preferred embodiment of the present invention.
Figure 3B:
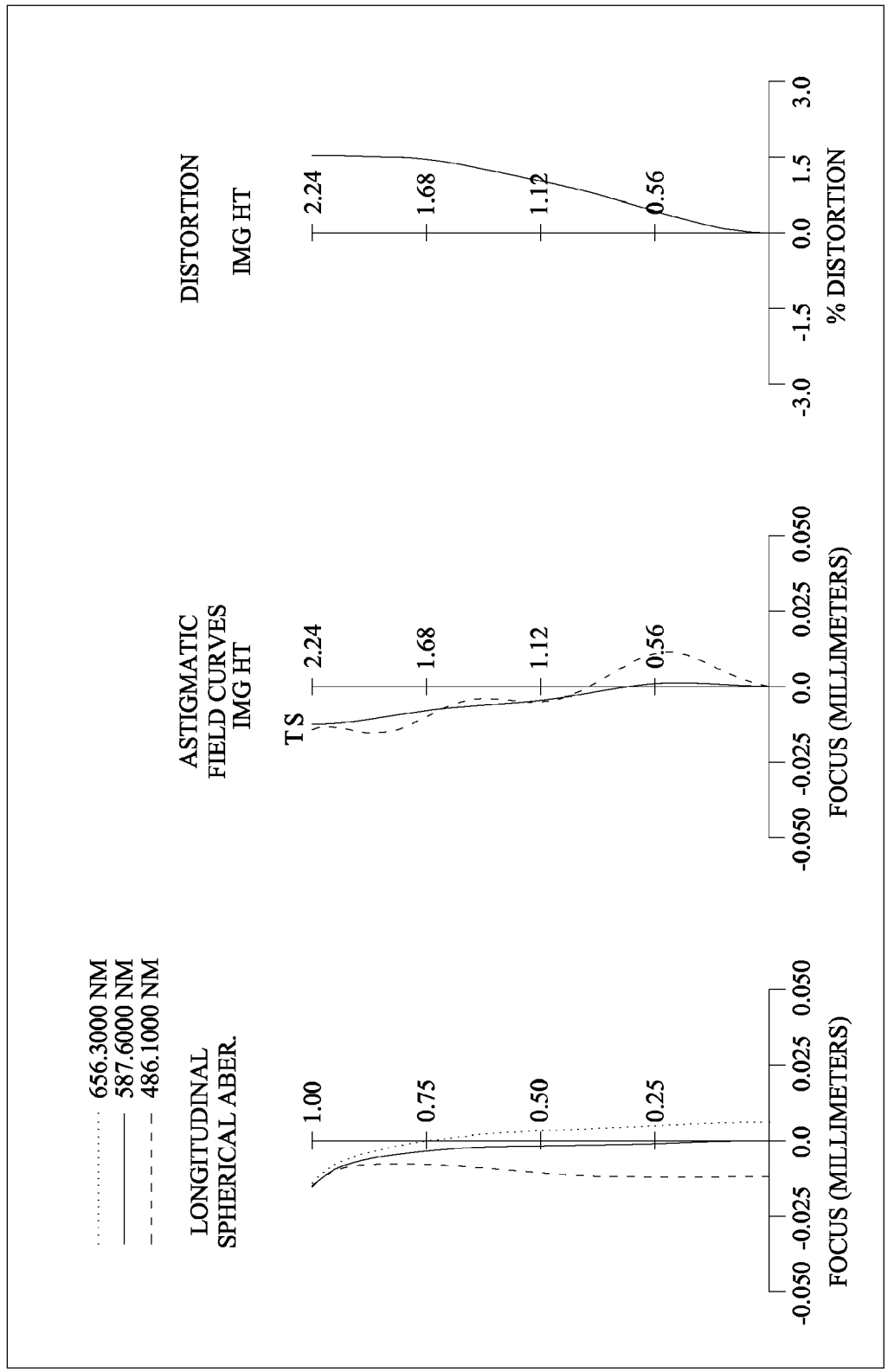
FIG. 3B is a series of aberration curves of the third preferred embodiment of the present invention.

With reference to FIGS. 3A and 3B for a schematic view of an optical system and a series of aberration curves in accordance with the first preferred embodiment of the present invention respectively, the image pickup optical lens assembly is an optical system comprising five lens elements, an infrared filter (360), an aperture stop (300) and an image sensor (380). More specifically, the image pickup optical lens assembly, sequentially arranged from an object side to an image side along an optical axis, comprises: a bi-convex first lens element (310) with positive refractive power and made of plastic, and both object-side surface (311) and image-side surface (312) thereof being aspheric; the second lens element (320) with negative refractive power, made of plastic, and having a convex object-side surface (321) and a convex image-side surface (322) near the optical axis, both object-side surface (321) and image-side surface (322) thereof being aspheric; the third lens element (330) with positive refractive power, made of plastic, and having a convex object-side surface (331) and a concave image-side surface (332) near the optical axis, both object-side surface (331) and image-side surface (332) thereof being aspheric; the fourth lens element (340) with positive refractive power, made of plastic, and having a concave object-side surface (341) and a convex image-side surface (342) near the optical axis, both object-side surface (341) and image-side surface (342) thereof being aspheric; the fifth lens element (350) with negative refractive power, made of plastic, and having a convex object-side surface (351) and a concave image-side surface (352) near the optical axis, both object-side surface (351) and image-side surface (352) thereof being aspheric, and at least one of the object-side surface (351) and the image-side surface (352) thereof having at least one inflection point; an infrared filter (IR-filter) (360) made of plate glass without affecting the focal length of the image pickup optical lens assembly of the present invention; and an image sensor (380) installed at an image plane (370). In this preferred embodiment, the image pickup optical lens assembly further comprises an aperture stop (300) disposed between the first lens element (310) and an object to be photographed.

With reference to FIG. 13 (Table 5) for the optical data of this preferred embodiment, the object-side surface of the first lens element (311), the image-side surface of the first lens element (312), the object-side surface of the second lens element (321), the image-side surface of the second lens element (322), the object-side surface of the third lens element (331), the image-side surface of the third lens element (332), the object-side surface of the fourth lens element (341), the image-side surface (342) of the fourth lens element, the object-side surface of the fifth lens element (351) and the image-side surface of the fifth lens element (352) are in compliance with the aspherical formula as shown in Equation (16) and the aspherical surface parameters are listed in FIG. 14 (Table 6).

In the image pickup optical lens assembly of the third preferred embodiment, the overall focal length of the image pickup optical lens assembly is f=3.52 (mm), the overall aperture stop value of the image pickup optical lens assembly (f-number) is Fno=2.40 and half of the maximum view angle is HFOV=32.1 (degrees).

With reference to Table 5 for the following data of this preferred embodiment, if $T_{12}$ is the distance from the image-side surface of the first lens element (312) to the object-side surface of the second lens element (321) along the optical axis, $T_{23}$ is the distance from the image-side surface of the second lens element (322) to the object-side surface of the third lens element (331) along the optical axis, $CT_4$ is the thickness of the fourth lens element (340) along the optical axis, $CT_5$ is the thickness of the fifth lens element (350) along the optical axis, f is the focal length of the image pickup optical lens assembly, and $f_1$ is the focal length of the first lens element (310), then the relations (1), (2) and (3) of $T_{12}/T_{23}$=1.00, $CT_4/CT_5$=0.43 and $f/f_1$=1.11 will be satisfied respectively.

If Td is the distance from the object-side surface of the first lens element (311) to the image-side surface of the fifth lens element (352) along optical axis, Sd is the distance from the aperture stop (300) to the image-side surface of the fifth lens element (352), then the relation (4) of Sd/Td=1.02 will be satisfied; if TTL is the distance from the object-side surface of the first lens element (311) to the image plane (370) along the optical axis, and ImgH is half of the diagonal length of the effective photosensitive area of the image sensor (380), then the relation (5) of TTL/ImgH=2.09; and if $CT_4$ is the thickness of the fourth lens element (340) and $CT_5$ is the thickness of the fifth lens element (350), and $T_{45}$ is the distance from the image-side surface of the fourth lens element (342) to the object-side surface of the fifth lens element (351), then the relation (15) of $(CT_4+T_{45})/CT_5$=0.48 will be satisfied.

In this preferred embodiment, if $v_1$ is the Abbe number of the first lens element (310) and $v_2$ is the Abbe number of the second lens element (320), then the relation (7) of $v_1-v_2$=32.5 will be satisfied; if $f_4$ is the focal length of the fourth lens element (340) and $f_5$ is the focal length of the fifth lens element (350), and f is the focal length of the image pickup optical lens assembly, then the relation (8) of $|f/f_4|+|f/f_5|=0.36$ will be satisfied; and if $R_1$ is the curvature radius of the object-side surface of the first lens element (311) and $R_2$ is the curvature radius of the image-side surface of the first lens element (312), then the relation (9) of $(R_1+R_2)/(R_1-R_2)=-0.54$ will be satisfied; and related computing data of the relations are listed in FIG. 25 (Table 17).

From the optical data as shown in FIG. 13 (Table 5) and the aberration curve as shown in FIG. 3B, good compensation effects of the longitudinal spherical aberration, astigmatic field curving and distortion can be achieved by the image pickup optical lens assembly in accordance with this preferred embodiment of the present invention.

Fourth Preferred Embodiment

Figure 4B:
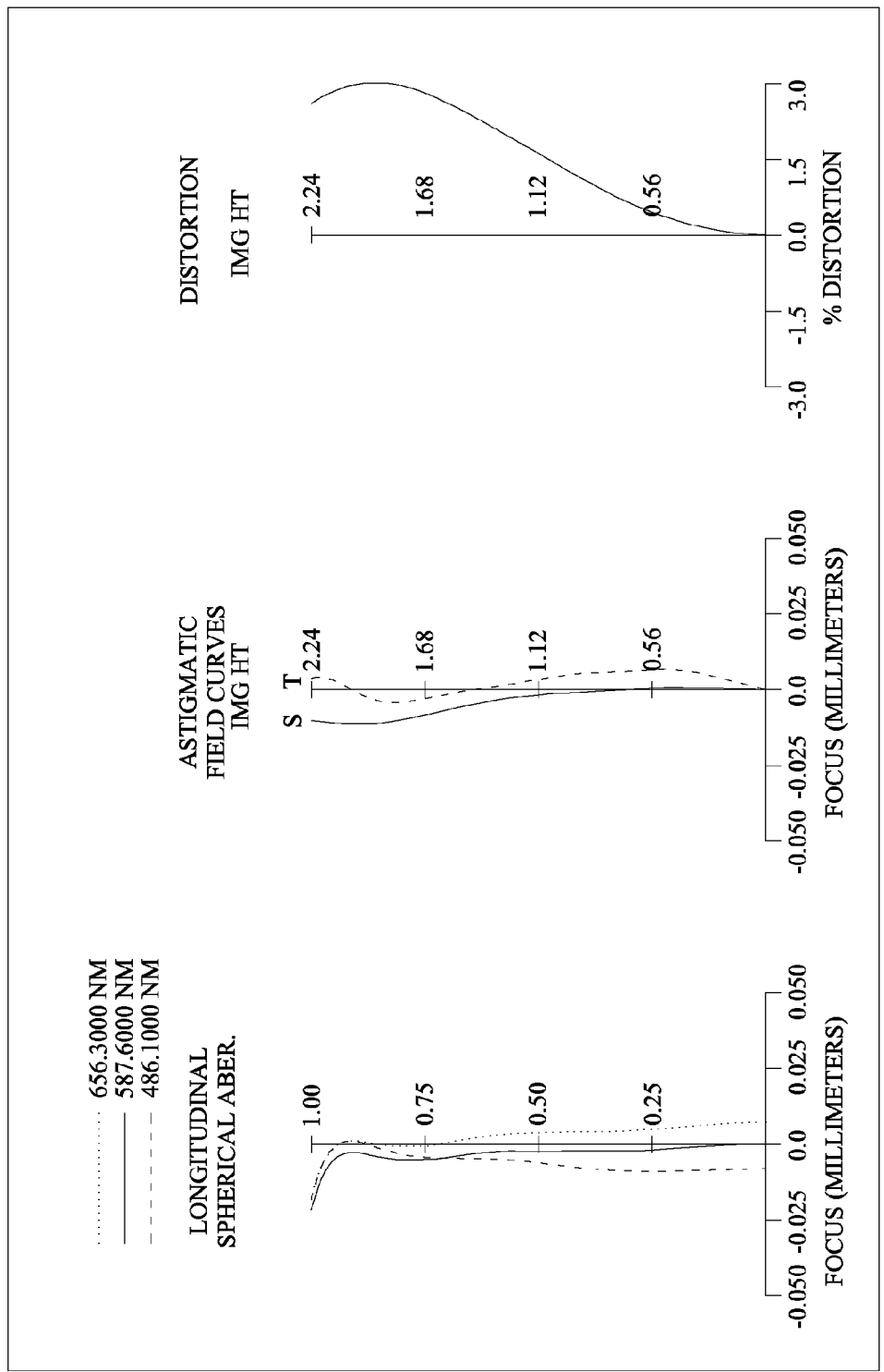
FIG. 4B is a series of aberration curves of the fourth preferred embodiment of the present invention.

With reference to FIGS. 4A and 4B for a schematic view of an optical system and a series of aberration curves in accordance with the first preferred embodiment of the present invention respectively, the image pickup optical lens assembly is an optical system comprising five lens elements, an infrared filter (460), an aperture stop (400) and an image sensor (480). More specifically, the image pickup optical lens assembly, sequentially arranged from an object side to an image side along an optical axis, comprises: a bi-convex first lens element (410) with positive refractive power and made of plastic, and both object-side surface (411) and image-side surface (412) thereof being aspheric; the second lens element (420) with negative refractive power, made of plastic, and having a concave object-side surface (421) and a concave image-side surface (422) near the optical axis, both object-side surface (421) and image-side surface (422) thereof being aspheric; the third lens element (430) with positive refractive power, made of plastic, and having a concave object-side surface (431) and a convex image-side surface (432) near the optical axis, both object-side surface (431) and image-side surface (432) thereof being aspheric; the fourth lens element (440) with positive refractive power, made of plastic, and having a concave object-side surface (441) and a convex image-side surface (442) near the optical axis, both object-side surface (441) and image-side surface (442) thereof being aspheric; the fifth lens element (450) with negative refractive power, made of plastic, and having a convex object-side surface (451) and a concave image-side surface (452) near the optical axis, both object-side surface (451) and image-side surface (452) thereof being aspheric, and at least one of the object-side surface (451) and the image-side surface (452) thereof having at least one inflection point; an infrared filter (IR-filter) (460) made of plate glass without affecting the focal length of the image pickup optical lens assembly of the present invention; and an image sensor (480) installed at an image plane (470). In this preferred embodiment, the image pickup optical lens assembly further comprises an aperture stop (400) disposed between the first lens element (410) and an object to be photographed.

With reference to FIG. 15 (Table 7) for the optical data of this preferred embodiment, the object-side surface of the first lens element (411), the image-side surface of the first lens element (412), the object-side surface of the second lens element (421), the image-side surface of the second lens element (422), the object-side surface of the third lens element (431), the image-side surface of the third lens element (432), the object-side surface of the fourth lens element (441), the image-side surface (442) of the fourth lens element, the object-side surface of the fifth lens element (451) and the image-side surface of the fifth lens element (452) are in compliance with the aspherical formula as shown in Equation (16) and the aspherical surface parameters are listed in FIG. 16 (Table 8).

In the image pickup optical lens assembly of the fourth preferred embodiment, the overall focal length of the image pickup optical lens assembly is f=3.54 (mm), the overall aperture stop value of the image pickup optical lens assembly (f-number) is Fno=2.20 and half of the maximum view angle is HFOV=31.7 (degrees).

With reference to Table 7 for the following data of this preferred embodiment, if $T_{12}$ is the distance from the image-side surface of the first lens element (412) to the object-side surface of the second lens element (421) along the optical axis, $T_{23}$ is the distance from the image-side surface of the second lens element (422) to the object-side surface of the third lens element (431) along the optical axis, $CT_4$ is the thickness of the fourth lens element (440) along the optical axis, $CT_5$ is the thickness of the fifth lens element (450) along the optical axis, f is the focal length of the image pickup optical lens assembly, and $f_1$ is the focal length of the first lens element (410), then the relations (1), (2) and (3) of $T_{12}/T_{23}=0.82$, $CT_4/CT_5=0.54$ and $f/f_1=1.28$ will be satisfied respectively.

If Td is the distance from the object-side surface of the first lens element (411) to the image-side surface of the fifth lens element (452) along optical axis, Sd is the distance from the aperture stop (400) to the image-side surface of the fifth lens element (452), then the relation (4) of Sd/Td=1.01 will be satisfied; if TTL is the distance from the object-side surface of the first lens element (411) to the image plane (470) along the optical axis, and ImgH is half of the diagonal length of the effective photosensitive area of the image sensor (480), then the relation (5) of TTL/ImgH=2.03; and if $CT_4$ is the thickness of the fourth lens element (440) and $CT_5$ is the thickness of the fifth lens element (450), and $T_{45}$ is the distance from the image-side surface of the fourth lens element (442) to the object-side surface of the fifth lens element (451), then the relation (15) of $(CT_4+T_{45})/CT_5=0.60$ will be satisfied.

In this preferred embodiment, if $v_1$ is the Abbe number of the first lens element (410) and $v_2$ is the Abbe number of the second lens element (420), then the relation (7) of $v_1-v_2=34.4$ will be satisfied; if $f_4$ is the focal length of the fourth lens element (440) and $f_5$ is the focal length of the fifth lens element (450), and f is the focal length of the image pickup optical lens assembly, then the relation (8) of $|f/f_4|+|f/f_5|=0.13$ will be satisfied; and if $R_1$ is the curvature radius of the object-side surface of the first lens element (411) and $R_2$ is the curvature radius of the image-side surface of the first lens element (412), then the relation (9) of $(R_1+R_2)/(R_1-R_2)=-0.56$ will be satisfied; and related computing data of the relations are listed in FIG. 25 (Table 17).

From the optical data as shown in FIG. 15 (Table 7) and the aberration curve as shown in FIG. 4B, good compensation effects of the longitudinal spherical aberration, astigmatic field curving and distortion can be achieved by the image pickup optical lens assembly in accordance with this preferred embodiment of the present invention.

Fifth Preferred Embodiment

Figure 5A:
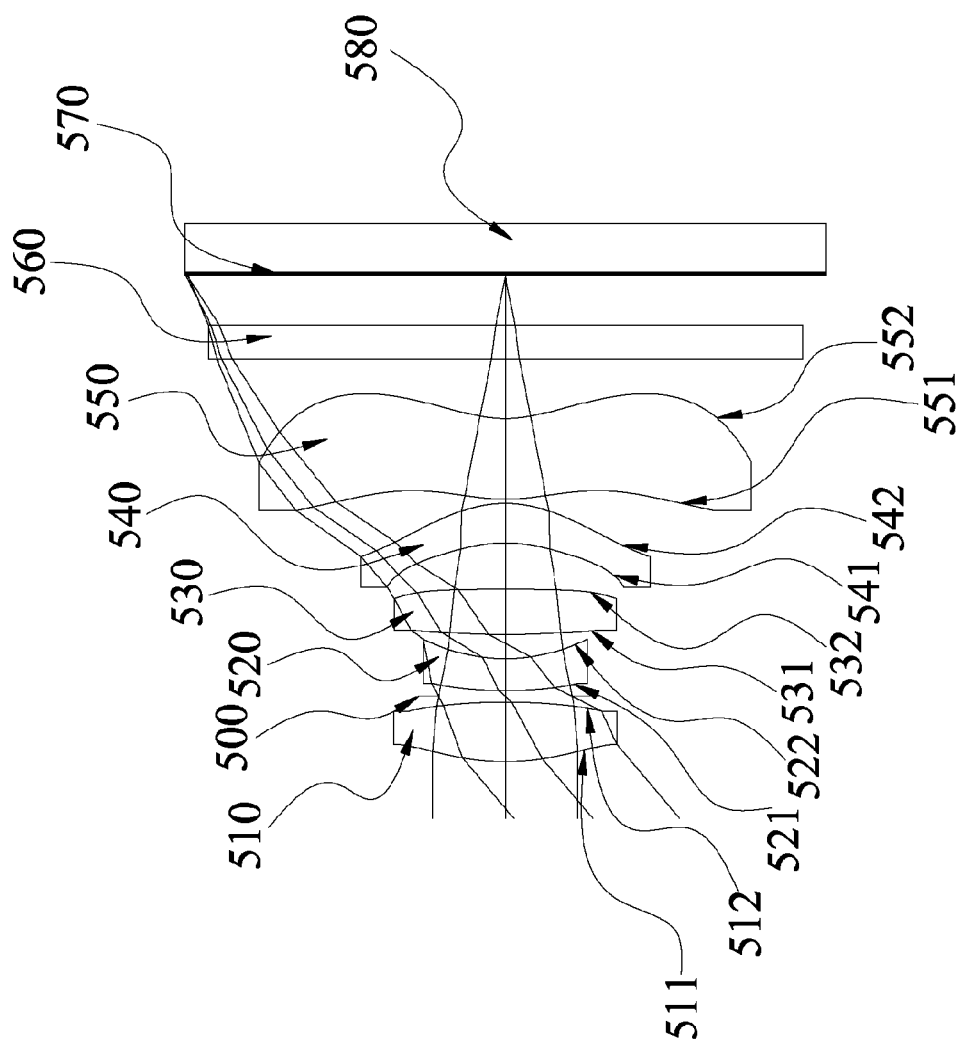
FIG. 5A is a schematic view of an image pickup optical lens assembly in accordance with the fifth preferred embodiment of the present invention.
Figure 5B:
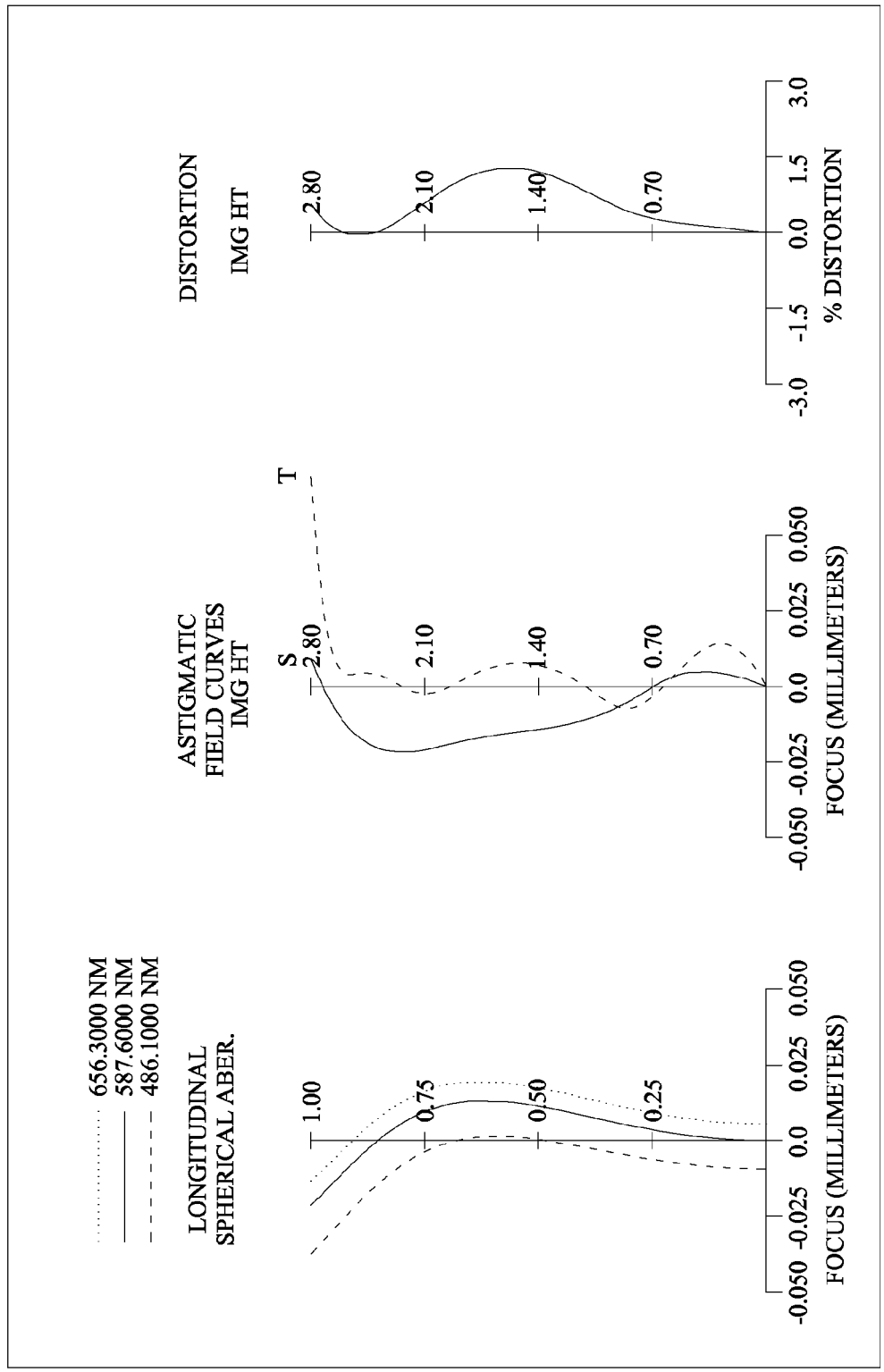
FIG. 5B is a series of aberration curves of the fifth preferred embodiment of the present invention.

With reference to FIGS. 5A and 5B for a schematic view of an optical system and a series of aberration curves in accordance with the first preferred embodiment of the present invention respectively, the image pickup optical lens assembly is an optical system comprising five lens elements, an infrared filter (560), an aperture stop (500) and an image sensor (580). More specifically, the image pickup optical lens assembly, sequentially arranged from an object side to an image side along an optical axis, comprises: a bi-convex first lens element (510) with positive refractive power and made of plastic, and both object-side surface (511) and image-side surface (512) thereof being aspheric; the second lens element (520) with negative refractive power, made of plastic, and having a convex object-side surface (521) and a concave image-side surface (522) near the optical axis, both object-side surface (521) and image-side surface (522) thereof being aspheric; the third lens element (530) with positive refractive power, made of plastic, and having a convex object-side surface (531) and a convex image-side surface (532) near the optical axis, both object-side surface (531) and image-side surface (532) thereof being aspheric; the fourth lens element (540) with positive refractive power, made of plastic, and having a concave object-side surface (541) and a convex image-side surface (542) near the optical axis, both object-side surface (541) and image-side surface (542) thereof being aspheric; the fifth lens element (550) with negative refractive power, made of plastic, and having a convex object-side surface (551) and a concave image-side surface (552) near the optical axis, both object-side surface (551) and image-side surface (552) thereof being aspheric, and at least one of the object-side surface (551) and the image-side surface (552) thereof having at least one inflection point; an infrared filter (IR-filter) (560) made of plate glass without affecting the focal length of the image pickup optical lens assembly of the present invention; and an image sensor (580) installed at an image plane (570). In this preferred embodiment, the image pickup optical lens assembly further comprises an aperture stop (500) disposed between the first lens element (510) and the second lens element (520).

With reference to FIG. 17 (Table 9) for the optical data of this preferred embodiment, the object-side surface of the first lens element (511), the image-side surface of the first lens element (512), the object-side surface of the second lens element (521), the image-side surface of the second lens element (522), the object-side surface of the third lens element (531), the image-side surface of the third lens element (532), the object-side surface of the fourth lens element (541), the image-side surface (542) of the fourth lens element, the object-side surface of the fifth lens element (551) and the image-side surface of the fifth lens element (552) are in compliance with the aspherical formula as shown in Equation (16) and the aspherical surface parameters are listed in FIG. 18 (Table 10).

In the image pickup optical lens assembly of the fifth preferred embodiment, the overall focal length of the image pickup optical lens assembly is f=3.30 (mm), the overall aperture stop value of the image pickup optical lens assembly (f-number) is Fno=2.60 and half of the maximum view angle is HFOV=40.2 (degrees).

With reference to Table 9 for the following data of this preferred embodiment, if $T_{12}$ is the distance from the image-side surface of the first lens element (512) to the object-side surface of the second lens element (521) along the optical axis, $T_{23}$ is the distance from the image-side surface of the second lens element (522) to the object-side surface of the third lens element (531) along the optical axis, $CT_4$ is the thickness of the fourth lens element (540) along the optical axis, $CT_5$ is the thickness of the fifth lens element (550) along the optical axis, f is the focal length of the image pickup optical lens assembly, and $f_1$ is the focal length of the first lens element (510), then the relations (1), (2) and (3) of $T_{12}/T_{23}$=0.48, $CT_4/CT_5$=0.49 and $f/f_1$=1.19 will be satisfied respectively.

If Td is the distance from the object-side surface of the first lens element (511) to the image-side surface of the fifth lens element (552) along optical axis, Sd is the distance from the aperture stop (500) to the image-side surface of the fifth lens element (552), then the relation (4) of Sd/Td=0.81 will be satisfied; if TTL is the distance from the object-side surface of the first lens element (511) to the image plane (570) along the optical axis, and ImgH is half of the diagonal length of the effective photosensitive area of the image sensor (580), then the relation (5) of TTL/ImgH=1.49; and if $CT_4$ is the thickness of the fourth lens element (540) and $CT_5$ is the thickness of the fifth lens element (550), and $T_{45}$ is the distance from the image-side surface of the fourth lens element (542) to the object-side surface of the fifth lens element (551), then the relation (15) of $(CT_4+T_{45})/CT_5$=0.54 will be satisfied.

In this preferred embodiment, if $v_1$ is the Abbe number of the first lens element (510) and $v_2$ is the Abbe number of the second lens element (520), then the relation (7) of $v_1-v_2$=32.1 will be satisfied; if $f_4$ is the focal length of the fourth lens element (540) and $f_5$ is the focal length of the fifth lens element (550), and f is the focal length of the image pickup optical lens assembly, then the relation (8) of $|f/f_4|+|f/f_5|$=0.56 will be satisfied; and if $R_1$ is the curvature radius of the object-side surface of the first lens element (511) and $R_2$ is the curvature radius of the image-side surface of the first lens element (512), then the relation (9) of $(R_1+R_2)/(R_1-R_2)$=−0.40 will be satisfied; and related computing data of the relations are listed in FIG. 25 (Table 17).

From the optical data as shown in FIG. 17 (Table 9) and the aberration curve as shown in FIG. 5B, good compensation effects of the longitudinal spherical aberration, astigmatic field curving and distortion can be achieved by the image pickup optical lens assembly in accordance with this preferred embodiment of the present invention.

Sixth Preferred Embodiment

Figure 6A:
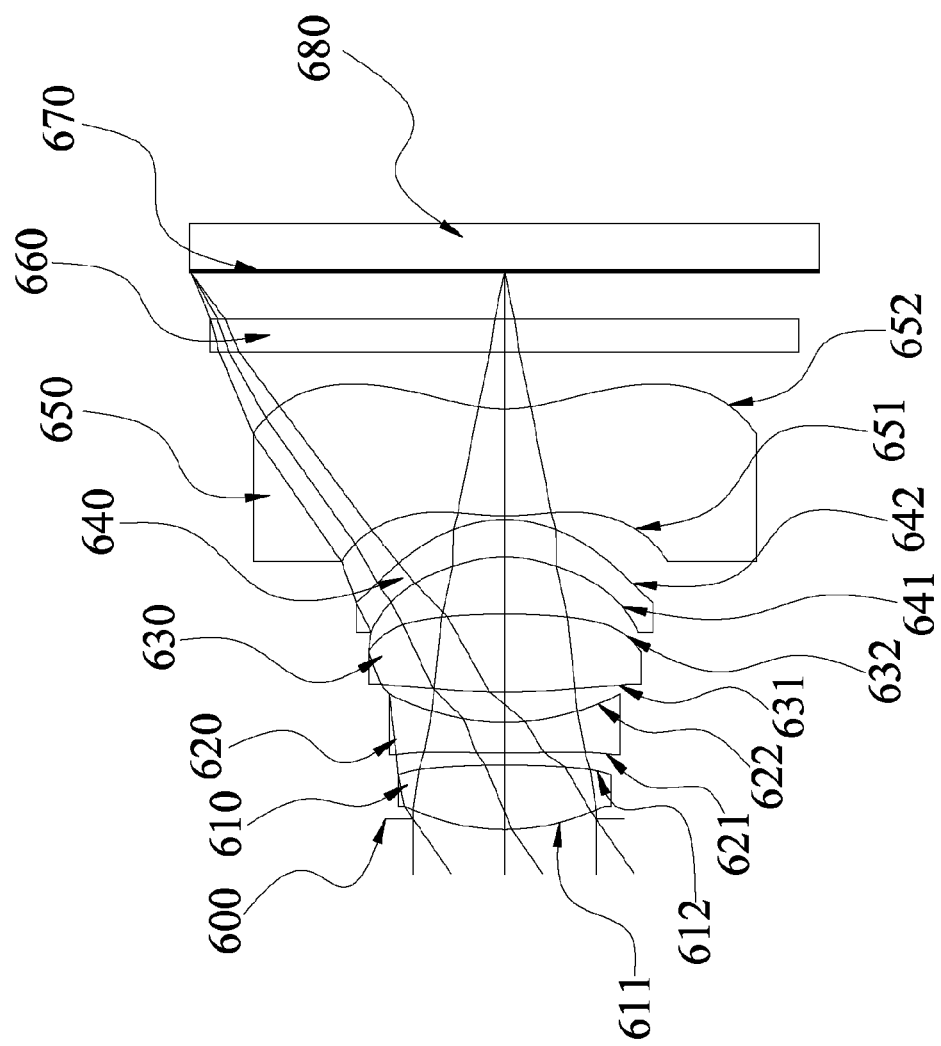
FIG. 6A is a schematic view of an image pickup optical lens assembly in accordance with the sixth preferred embodiment of the present invention.
Figure 6B:
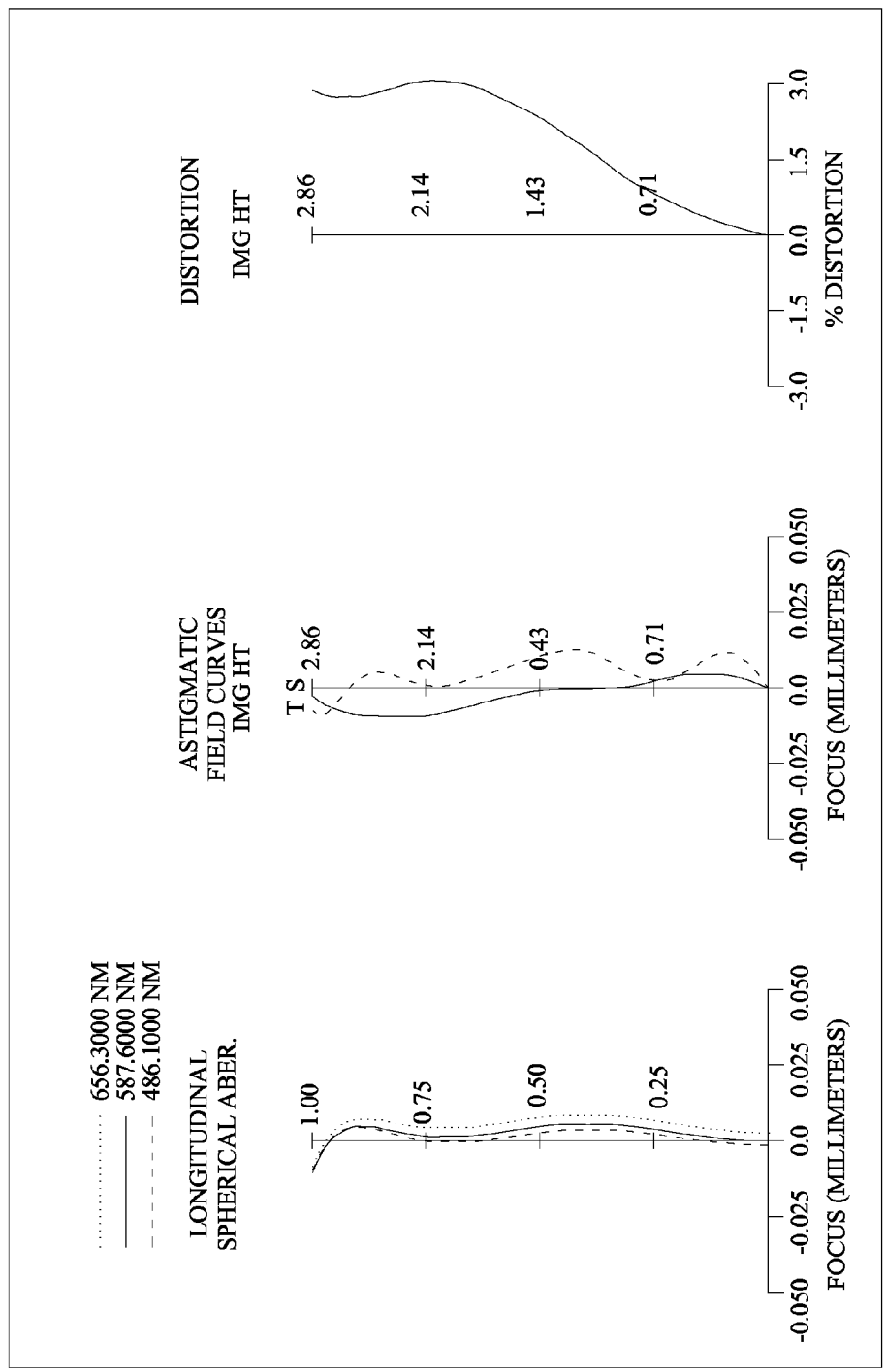
FIG. 6B is a series of aberration curves of the sixth preferred embodiment of the present invention.

With reference to FIGS. 6A and 6B for a schematic view of an optical system and a series of aberration curves in accordance with the first preferred embodiment of the present invention respectively, the image pickup optical lens assembly is an optical system comprising five lens elements, an infrared filter (660), an aperture stop (600) and an image sensor (680). More specifically, the image pickup optical lens assembly, sequentially arranged from an object side to an image side along an optical axis, comprises: a bi-convex first lens element (610) with positive refractive power and made of plastic, and both object-side surface (611) and image-side surface (612) thereof being aspheric; the second lens element (620) with negative refractive power, made of plastic, and having a convex object-side surface (621) and a concave image-side surface (622) near the optical axis, both object-side surface (621) and image-side surface (622) thereof being aspheric; the third lens element (630) with positive refractive power, made of plastic, and having a convex object-side surface (631) and a convex image-side surface (632) near the optical axis, both object-side surface (631) and image-side surface (632) thereof being aspheric; the fourth lens element (640) with positive refractive power, made of plastic, and having a concave object-side surface (641) and a convex image-side surface (642) near the optical axis, both object-side surface (641) and image-side surface (642) thereof being aspheric; the fifth lens element (650) with negative refractive power, made of plastic, and having a convex object-side surface (651) and a concave image-side surface (652) near the optical axis, both object-side surface (651) and image-side surface (652) thereof being aspheric, and at least one of the object-side surface (651) and the image-side surface (652) thereof having at least one inflection point; an infrared filter (IR-filter) (660) made of plate glass without affecting the focal length of the image pickup optical lens assembly of the present invention; and an image sensor (680) installed at an image plane (670). In this preferred embodiment, the image pickup optical lens assembly further comprises an aperture stop (600) disposed between the first lens element (610) and an object to be photographed.

With reference to FIG. 19 (Table 11) for the optical data of this preferred embodiment, the object-side surface of the first lens element (611), the image-side surface of the first lens element (612), the object-side surface of the second lens element (621), the image-side surface of the second lens element (622), the object-side surface of the third lens element (631), the image-side surface of the third lens element (632), the object-side surface of the fourth lens element (641), the image-side surface (642) of the fourth lens element, the object-side surface of the fifth lens element (651) and the image-side surface of the fifth lens element (652) are in compliance with the aspherical formula as shown in Equation (16) and the aspherical surface parameters are listed in FIG. 20 (Table 12).

In the image pickup optical lens assembly of the sixth preferred embodiment, the overall focal length of the image pickup optical lens assembly is f=3.99 (mm), the overall aperture stop value of the image pickup optical lens assembly (f-number) is Fno=2.40 and half of the maximum view angle is HFOV=34.8 (degrees).

With reference to Table 11 for the following data of this preferred embodiment, if $T_{12}$ is the distance from the image-side surface of the first lens element (612) to the object-side surface of the second lens element (621) along the optical axis, $T_{23}$ is the distance from the image-side surface of the second lens element (622) to the object-side surface of the third lens element (631) along the optical axis, $CT_4$ is the thickness of the fourth lens element (640) along the optical axis, $CT_5$ is the thickness of the fifth lens element (650) along the optical axis, f is the focal length of the image pickup optical lens assembly, and $f_1$ is the focal length of the first lens element (610), then the relations (1), (2) and (3) of $T_{12}/T_{23}=0.40$, $CT_4/CT_5=035$ and $f/f_1=1.38$ will be satisfied respectively.

If Td is the distance from the object-side surface of the first lens element (611) to the image-side surface of the fifth lens element (652) along optical axis, Sd is the distance from the aperture stop (600) to the image-side surface of the fifth lens element (652), then the relation (4) of Sd/Td=0.97 will be satisfied; if TTL is the distance from the object-side surface of the first lens element (611) to the image plane (670) along the optical axis, and ImgH is half of the diagonal length of the effective photosensitive area of the image sensor (680), then the relation (5) of TTL/ImgH=1.75; and if $CT_4$ is the thickness of the fourth lens element (640) and $CT_5$ is the thickness of the fifth lens element (650), and $T_{45}$ is the distance from the image-side surface of the fourth lens element (642) to the object-side surface of the fifth lens element (651), then the relation (15) of $(CT_4+T_{45})/CT_5=0.38$ will be satisfied.

In this preferred embodiment, if $v_1$ is the Abbe number of the first lens element (610) and $v_2$ is the Abbe number of the second lens element (620), then the relation (7) of $v_1-v_2=30.3$ will be satisfied; if $f_4$ is the focal length of the fourth lens element (640) and $f_5$ is the focal length of the fifth lens element (650), and f is the focal length of the image pickup optical lens assembly, then the relation (8) of $|f/f_4|+|f/f_5|=0.33$ will be satisfied; and if $R_1$ is the curvature radius of the object-side surface of the first lens element (611) and $R_2$ is the curvature radius of the image-side surface of the first lens element (612), then the relation (9) of $(R_1+R_2)/(R_1-R_2)=-0.58$ will be satisfied; and related computing data of the relations are listed in FIG. 25 (Table 17).

From the optical data as shown in FIG. 19 (Table 11) and the aberration curve as shown in FIG. 6B, good compensation effects of the longitudinal spherical aberration, astigmatic field curving and distortion can be achieved by the image pickup optical lens assembly in accordance with this preferred embodiment of the present invention.

Seventh Preferred Embodiment

Figure 7A:
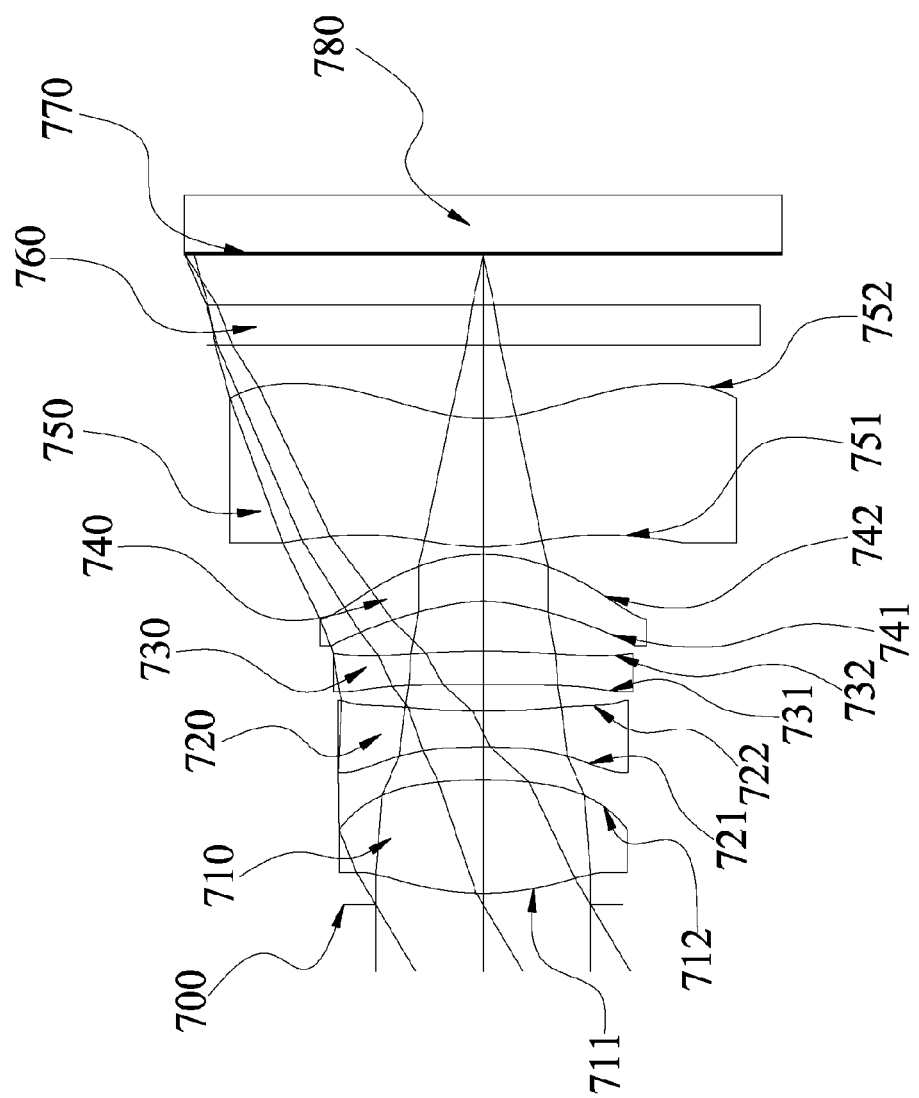
FIG. 7A is a schematic view of an image pickup optical lens assembly in accordance with the seventh preferred embodiment of the present invention.
Figure 7B:
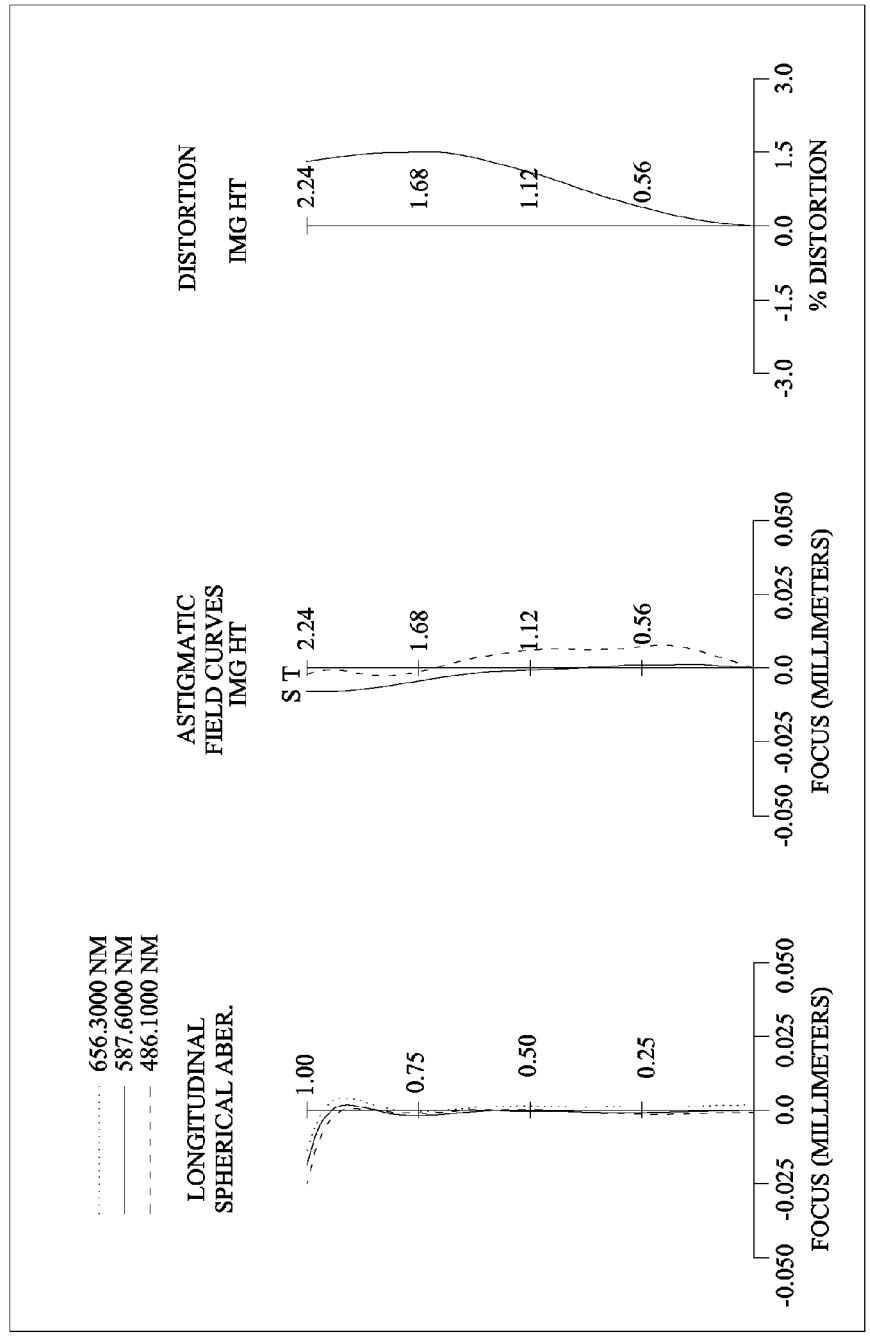
FIG. 7B is a series of aberration curves of the seventh preferred embodiment of the present invention.

With reference to FIGS. 7A and 7B for a schematic view of an optical system and a series of aberration curves in accordance with the first preferred embodiment of the present invention respectively, the image pickup optical lens assembly is an optical system comprising five lens elements, an infrared filter (760), an aperture stop (700) and an image sensor (780). More specifically, the image pickup optical lens assembly, sequentially arranged from an object side to an image side along an optical axis, comprises: a bi-convex first lens element (710) with positive refractive power and made of plastic, and both object-side surface (711) and image-side surface (712) thereof being aspheric; the second lens element (720) with negative refractive power, made of plastic, and having a concave object-side surface (721) and a concave image-side surface (722) near the optical axis, both object-side surface (721) and image-side surface (722) thereof being aspheric; the third lens element (730) with positive refractive power, made of plastic, and having a concave object-side surface (731) and a convex image-side surface (732) near the optical axis, both object-side surface (731) and image-side surface (732) thereof being aspheric; the fourth lens element (740) with positive refractive power, made of plastic, and having a concave object-side surface (741) and a convex image-side surface (742) near the optical axis, both object-side surface (741) and image-side surface (742) thereof being aspheric; the fifth lens element (750) with negative refractive power, made of plastic, and having a convex object-side surface (751) and a concave image-side surface (752) near the optical axis, both object-side surface (751) and image-side surface (752) thereof being aspheric, and at least one of the object-side surface (751) and the image-side surface (752) thereof having at least one inflection point; an infrared filter (IR-filter) (760) made of plate glass without affecting the focal length of the image pickup optical lens assembly of the present invention; and an image sensor (780) installed at an image plane (770). In this preferred embodiment, the image pickup optical lens assembly further comprises an aperture stop (700) disposed between the first lens element (710) and an object to be photographed.

With reference to FIG. 21 (Table 13) for the optical data of this preferred embodiment, the object-side surface of the first lens element (711), the image-side surface of the first lens element (712), the object-side surface of the second lens element (721), the image-side surface of the second lens element (722), the object-side surface of the third lens element (731), the image-side surface of the third lens element (732), the object-side surface of the fourth lens element (741), the image-side surface (742) of the fourth lens element, the object-side surface of the fifth lens element (751) and the image-side surface of the fifth lens element (752) are in compliance with the aspherical formula as shown in Equation (16) and the aspherical surface parameters are listed in FIG. 22 (Table 14).

In the image pickup optical lens assembly of the seventh preferred embodiment, the overall focal length of the image pickup optical lens assembly is f=3.70 (mm), the overall aperture stop value of the image pickup optical lens assembly (f-number) is Fno=2.30 and half of the maximum view angle is HFOV=30.8 (degrees).

With reference to Table 13 for the following data of this preferred embodiment, if $T_{12}$ is the distance from the image-side surface of the first lens element (712) to the object-side surface of the second lens element (721) along the optical axis, $T_{23}$ is the distance from the image-side surface of the second lens element (722) to the object-side surface of the third lens element (731) along the optical axis, $CT_4$ is the thickness of the fourth lens element (740) along the optical axis, $CT_5$ is the thickness of the fifth lens element (750) along the optical axis, f is the focal length of the image pickup optical lens assembly, and $f_1$ is the focal length of the first lens element (710), then the relations (1), (2) and (3) of $T_{12}/T_{23}$=1.24, $CT_4/CT_5$=0.37 and $f/f_1$=1.47 will be satisfied respectively.

If Td is the distance from the object-side surface of the first lens element (711) to the image-side surface of the fifth lens element (752) along optical axis, Sd is the distance from the aperture stop (700) to the image-side surface of the fifth lens element (752), then the relation (4) of Sd/Td=1.02 will be satisfied; if TTL is the distance from the object-side surface of the first lens element (711) to the image plane (770) along the optical axis, and ImgH is half of the diagonal length of the effective photosensitive area of the image sensor (780), then the relation (5) of TTL/ImgH=2.10; and if $CT_4$ is the thickness of the fourth lens element (740) and $CT_5$ is the thickness of the fifth lens element (750), and $T_{45}$ is the distance from the image-side surface of the fourth lens element (742) to the object-side surface of the fifth lens element (751), then the relation (15) of $(CT_4+T_{45})/CT_5$=0.42 will be satisfied.

In this preferred embodiment, if $v_1$ is the Abbe number of the first lens element (710) and $v_2$ is the Abbe number of the second lens element (720), then the relation (7) of $v_1-v_2$=33.1 will be satisfied; if $f_4$ is the focal length of the fourth lens element (740) and $f_5$ is the focal length of the fifth lens element (750), and f is the focal length of the image pickup optical lens assembly, then the relation (8) of $|f/f_4|+|f/f_5|$=0.05 will be satisfied; and if $R_1$ is the curvature radius of the object-side surface of the first lens element (711) and $R_2$ is the curvature radius of the image-side surface of the first lens element (712), then the relation (9) of $(R_1+R_2)/(R_1-R_2)$=−0.29 will be satisfied; and related computing data of the relations are listed in FIG. 25 (Table 17).

From the optical data as shown in FIG. 21 (Table 13) and the aberration curve as shown in FIG. 7B, good compensation effects of the longitudinal spherical aberration, astigmatic field curving and distortion can be achieved by the image pickup optical lens assembly in accordance with this preferred embodiment of the present invention.

Eighth Preferred Embodiment

Figure 8A:
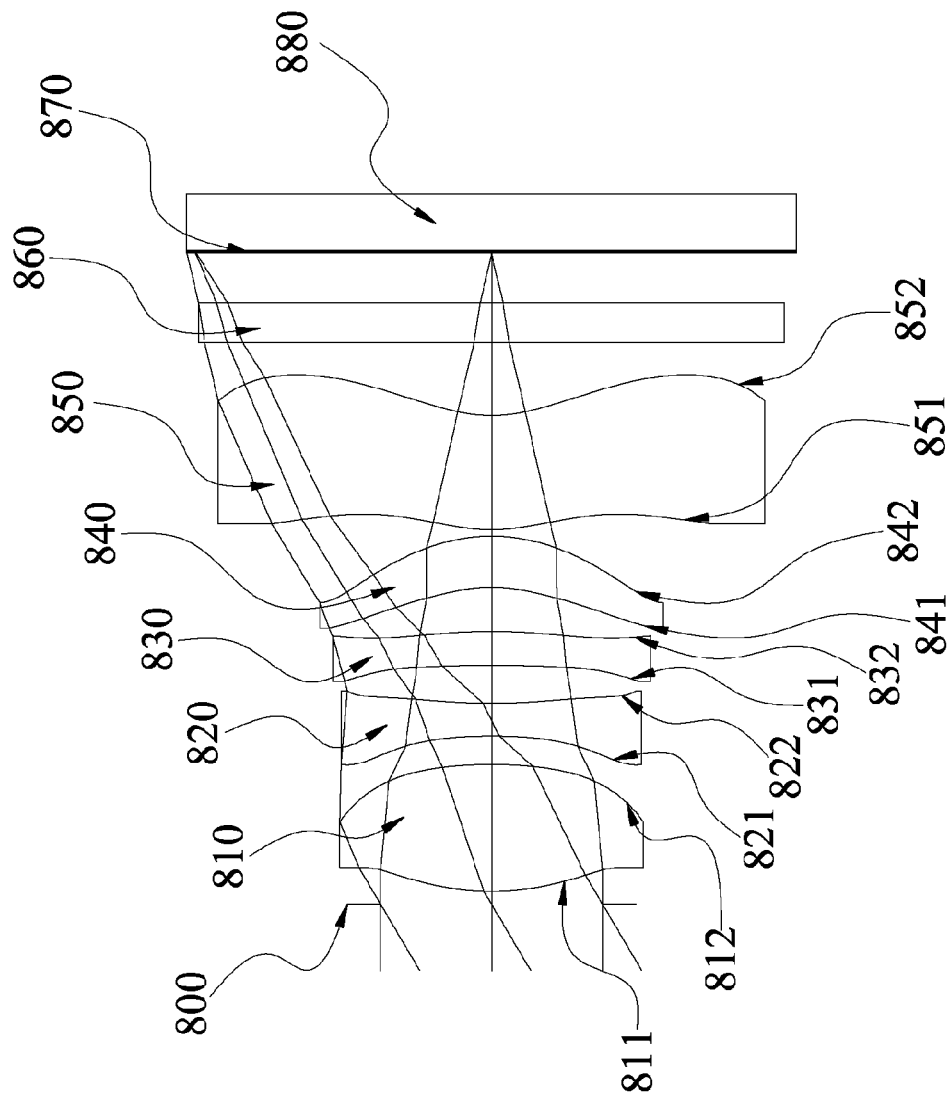
FIG. 8A is a schematic view of an image pickup optical lens assembly in accordance with the eighth preferred embodiment of the present invention.
Figure 8B:
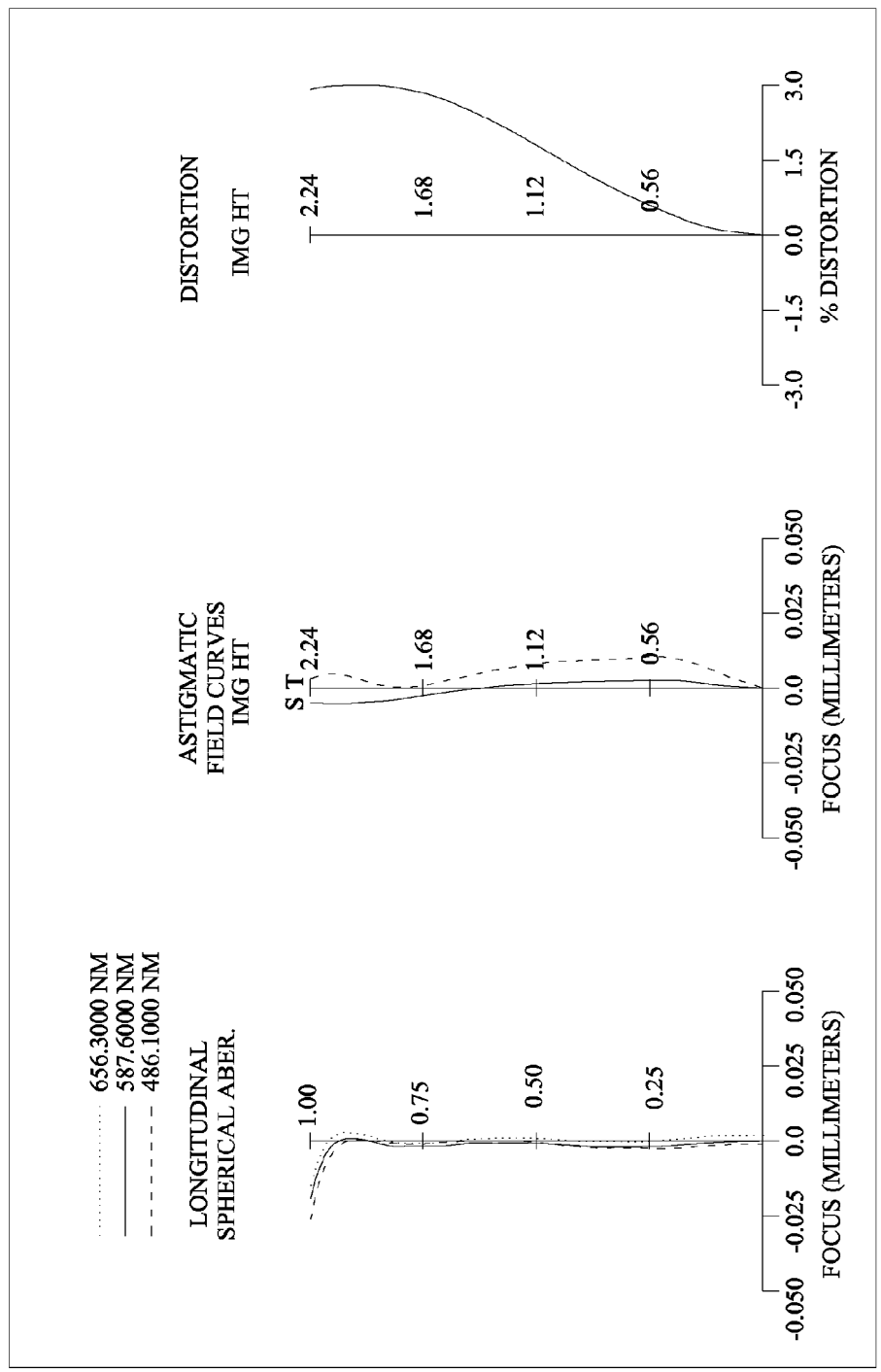
FIG. 8B is a series of aberration curves of the eighth preferred embodiment of the present invention.

With reference to FIGS. 8A and 8B for a schematic view of an optical system and a series of aberration curves in accordance with the first preferred embodiment of the present invention respectively, the image pickup optical lens assembly is an optical system comprising five lens elements, an infrared filter (860), an aperture stop (800) and an image sensor (880). More specifically, the image pickup optical lens assembly, sequentially arranged from an object side to an image side along an optical axis, comprises: a bi-convex first lens element (810) with positive refractive power and made of plastic, and both object-side surface (811) and image-side surface (812) thereof being aspheric; the second lens element (820) with negative refractive power, made of plastic, and having a concave object-side surface (821) and a concave image-side surface (822) near the optical axis, both object-side surface (821) and image-side surface (822) thereof being aspheric; the third lens element (830) with positive refractive power, made of plastic, and having a concave object-side surface (831) and a convex image-side surface (832) near the optical axis, both object-side surface (831) and image-side surface (832) thereof being aspheric; the fourth lens element (840) with positive refractive power, made of plastic, and having a concave object-side surface (841) and a convex image-side surface (842) near the optical axis, both object-side surface (841) and image-side surface (842) thereof being aspheric; the fifth lens element (850) with negative refractive power, made of plastic, and having a convex object-side surface (851) and a concave image-side surface (852) near the optical axis, both object-side surface (851) and image-side surface (852) thereof being aspheric, and at least one of the object-side surface (851) and the image-side surface (852) thereof having at least one inflection point; an infrared filter (IR-filter) (860) made of plate glass without affecting the focal length of the image pickup optical lens assembly of the present invention; and an image sensor (880) installed at an image plane (870). In this preferred embodiment, the image pickup optical lens assembly further comprises an aperture stop (800) disposed between the first lens element (810) and an object to be photographed.

With reference to FIG. 23 (Table 15) for the optical data of this preferred embodiment, the object-side surface of the first lens element (811), the image-side surface of the first lens element (812), the object-side surface of the second lens element (821), the image-side surface of the second lens element (822), the object-side surface of the third lens element (831), the image-side surface of the third lens element (832), the object-side surface of the fourth lens element (841), the image-side surface (842) of the fourth lens element, the object-side surface of the fifth lens element (851) and the image-side surface of the fifth lens element (852) are in compliance with the aspherical formula as shown in Equation (16) and the aspherical surface parameters are listed in FIG. 24 (Table 16).

In the image pickup optical lens assembly of the eighth preferred embodiment, the overall focal length of the image pickup optical lens assembly is f=3.69 (mm), the overall aperture stop value of the image pickup optical lens assembly (f-number) is Fno=2.20 and half of the maximum view angle is HFOV=30.6 (degrees).

With reference to Table 15 for the following data of this preferred embodiment, if $T_{12}$ is the distance from the image-side surface of the first lens element (812) to the object-side surface of the second lens element (821) along the optical axis, $T_{23}$ is the distance from the image-side surface of the second lens element (822) to the object-side surface of the third lens element (831) along the optical axis, $CT_4$ is the thickness of the fourth lens element (840) along the optical axis, $CT_5$ is the thickness of the fifth lens element (850) along the optical axis, f is the focal length of the image pickup optical lens assembly, and $f_1$ is the focal length of the first lens element (810), then the relations (1), (2) and (3) of $T_{12}/T_{23}$=0.75, $CT_4/CT_5$=0.45 and $f/f_1$=1.48 will be satisfied respectively.

If Td is the distance from the object-side surface of the first lens element (811) to the image-side surface of the fifth lens element (852) along optical axis, Sd is the distance from the aperture stop (800) to the image-side surface of the fifth lens element (852), then the relation (4) of Sd/Td=1.03 will be satisfied; if TTL is the distance from the object-side surface of the first lens element (811) to the image plane (870) along the optical axis, and ImgH is half of the diagonal length of the effective photosensitive area of the image sensor (880), then the relation (5) of TTL/ImgH=2.11; and if $CT_4$ is the thickness of the fourth lens element (840) and $CT_5$ is the thickness of the fifth lens element (850), and $T_{45}$ is the distance from the image-side surface of the fourth lens element (842) to the object-side surface of the fifth lens element (851), then the relation (15) of $(CT_4+T_{45})/CT_5=0.51$ will be satisfied.

In this preferred embodiment, if $v_1$ is the Abbe number of the first lens element (810) and $v_2$ is the Abbe number of the second lens element (820), then the relation (7) of $v_1-v_2=33.1$ will be satisfied; if $f_4$ is the focal length of the fourth lens element (840) and $f_5$ is the focal length of the fifth lens element (850), and f is the focal length of the image pickup optical lens assembly, then the relation (8) of $|f/f_4|+|f/f_5|=0.11$ will be satisfied; and if $R_1$ is the curvature radius of the object-side surface of the first lens element (811) and $R_2$ is the curvature radius of the image-side surface of the first lens element (812), then the relation (9) of $(R_1+R_2)/(R_1-R_2)=-0.28$ will be satisfied; and related computing data of the relations are listed in FIG. 25 (Table 17).

From the optical data as shown in FIG. 23 (Table 15) and the aberration curve as shown in FIG. 8B, good compensation effects of the longitudinal spherical aberration, astigmatic field curving and distortion can be achieved by the image pickup optical lens assembly in accordance with this preferred embodiment of the present invention.

In the image pickup optical lens assembly of the present invention, the lens can be made of glass or plastic. If the lens is made of glass, the refractive power for the image pickup optical system can be selected more flexibly. If the lens is made of plastic, the production cost can be reduced effectively. In addition, an aspherical surface is formed on an optical surface of the lens, and the aspherical surface can be easily manufactured into a shape other than that of a spherical surface to have more control factors to eliminate or reduce aberrations, so as to reduce the number of lenses used and the total length of the image pickup optical system of the present invention.

In the image pickup optical lens assembly of the present invention, if the lens surface is a convex surface, the lens surface proximate to the axis is a convex surface; and if the lens surface is a concave surface, the lens surface proximate to the axis is a concave surface.

In the image pickup optical lens assembly of the present invention, at least one aperture stop (not shown in the figure) such as a glare stop or a field stop is provided for reducing stray lights to facilitate improving the image quality.

Tables 1 to 16 (corresponding to FIGS. 9 to 24 respectively) show changes of values of an imagery optical system in accordance with each preferred embodiment of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those skilled in the art without departing from the scope and spirit of the invention set forth in the claims.

What is claimed is:

1. An image pickup optical lens assembly, sequentially arranged from an object side to an image side, comprising:
   a first lens element with positive refractive power, having a convex object-side surface;
   a second lens element with negative refractive power;
   a third lens element with refractive power;
   a fourth lens element with refractive power, having a concave object-side surface and a convex image-side surface, both object-side surface and image-side surface thereof being aspheric; and
   a fifth lens element with refractive power, having a convex object-side surface and a concave image-side surface, both object-side surface and image-side surface thereof being aspheric;
   wherein $T_{12}$ is an axial distance between the first lens element and the second lens element, $T_{23}$ is an axial distance between the second lens element and the third lens element, $CT_4$ is a thickness of the fourth lens element near the optical axis, $CT_5$ is a thickness of the fifth lens element near the optical axis, f is a focal length of the image pickup optical lens assembly, $f_1$ is a focal length of the first lens element, and the following relations are satisfied:

$0.3<T_{12}/T_{23}<1.8$;

$0.2<CT_4/CT_5<0.9$;

$0.85<f/f_1<1.55$.

2. The image pickup optical lens assembly of claim 1, wherein at least one of the object-side surface and the image-side surface of the second lens element is aspheric; at least one of the object-side surface and the image-side surface of the third lens element is aspheric; and at least one of the object-side surface and the image-side surface of the fifth lens element has at least one inflection point.

3. The image pickup optical lens assembly of claim 2, wherein Sd is an axial distance from the stop to the image-side surface of the fifth lens element, Td is an axial distance from the object-side surface of the first lens element to the image-side surface of the fifth lens element, and the following relation is satisfied:

$0.75<Sd/Td<1.2$.

4. The image pickup optical lens assembly of claim 3, further comprising an image sensor at an image plane, wherein TTL is an axial distance from the object-side surface of the first lens element to the image plane, ImgH is half of the diagonal length of an effective photosensitive area of the image sensor, and the following relation is satisfied:

$TTL/ImgH<2.3$.

5. The image pickup optical lens assembly of claim 3, wherein the third lens element has positive refractive power, and the fifth lens element is made of plastic.

6. The image pickup optical lens assembly of claim 5, wherein f is the focal length of the image pickup optical lens assembly, and $f_1$ is the focal length of the first lens element, and the following relation is satisfied:

$0.95<f/f_1<1.40$.

7. The image pickup optical lens assembly of claim 5, wherein $CT_4$ is the thickness of the fourth lens element near the optical axis, $CT_5$ is the thickness of the fifth lens element near the optical axis, and the following relation is preferably satisfied:

$$0.3<CT_4/CT_5<0.7.$$

8. The image pickup optical lens assembly of claim 7, wherein the fourth lens element has positive refractive power, and the fifth lens element has negative refractive power.

9. The image pickup optical lens assembly of claim 7, wherein $CT_4$ is the thickness of the fourth lens element near the optical axis, $CT_5$ is the thickness of the fifth lens element near the optical axis, and the following relation is preferably satisfied:

$$0.35<CT_4/CT_5<0.55.$$

10. The image pickup optical lens assembly of claim 3, wherein $T_{12}$ is the axial distance between the first lens element and the second lens element, $T_{23}$ is the axial distance between the second lens element and the third lens element, and the following relation is preferably satisfied:

$$0.39<T_{12}/T_{23}<1.25.$$

11. The image pickup optical lens assembly of claim 10, wherein $v_1$ is the Abbe number of the first lens element, $v_2$ is the Abbe number of the second lens element, and the following relation is satisfied:

$$28<v_1-v_2<42.$$

12. The image pickup optical lens assembly of claim 11, wherein f is the focal length of the image pickup optical lens assembly, $f_4$ is a focal length of the fourth lens element, $f_5$ is a focal length of the fifth lens element, and the following relation is satisfied:

$$|f/f_4|+|f/f_5|<0.6.$$

13. The image pickup optical lens assembly of claim 10, wherein $R_1$ is a curvature radius of the object-side surface of the first lens element, $R_2$ is a curvature radius of the image-side surface of the first lens element, and the following relation is satisfied:

$$-0.8<(R_1+R_2)/(R_1-R_2)<-0.2.$$

14. The image pickup optical lens assembly of claim 10, wherein Td is the axial distance from the object-side surface of the first lens element to the image-side surface of the fifth lens element, Sd is the axial distance from the stop to the image-side surface of the fifth lens element, and the following relation is preferably satisfied:

$$0.9<Sd/Td<1.1.$$

15. An image pickup optical lens assembly, sequentially arranged from an object side to an image side, comprising:
a first lens element with positive refractive power, having a convex object-side surface;
a second lens element with negative refractive power;
a third lens element with positive refractive power;
a fourth lens element with refractive power, having a concave object-side surface and a convex image-side surface, both object-side surface and image-side surface thereof being aspheric; and
a fifth lens element with refractive power, having a convex object-side surface and a concave image-side surface, both object-side surface and image-side surface thereof being aspheric;

wherein $T_{12}$ is an axial distance between the first lens element and the second lens element, $T_{23}$ is an axial distance between the second lens element and the third lens element, $CT_4$ is a thickness of the fourth lens element near the optical axis, $T_{45}$ is an axial distance between the fourth lens element and the fifth lens element, $CT_5$ is a thickness of the fifth lens element near the optical axis, f is a focal length of the image pickup optical lens assembly, $f_4$ is a focal length of the fourth lens element, $f_5$ is a focal length of the fifth lens element, and the following relations are satisfied:

$$0.3<T_{12}/T_{23}<1.8;$$

$$0.3<(CT_4+T_{45})/CT_5<0.7;$$

$$|f/f_4|+|f/f_5|<1.8.$$

16. The image pickup optical lens assembly of claim 15, wherein at least one of the object-side surface and the image-side surface of the fifth lens element has at least one inflection point, and the fifth lens element is made of plastic.

17. The image pickup optical lens assembly of claim 16, wherein f is the focal length of the image pickup optical lens assembly, $f_1$ is a focal length of the first lens element, the following relation is satisfied:

$$0.85<f/f_1<1.55.$$

18. The image pickup optical lens assembly of claim 16, wherein $CT_4$ is the thickness of the fourth lens element near the optical axis, $CT_5$ is the thickness of the fifth lens element near the optical axis, and the following relation is satisfied:

$$0.35<CT_4/CT_5<0.55.$$

19. The image pickup optical lens assembly of claim 16, wherein f is the focal length of the image pickup optical lens assembly, $f_4$ is the focal length of the fourth lens element, $f_5$ is the focal length of the fifth lens element, and the following relation is preferably satisfied:

$$|f/f_4|+|f/f_5|<0.6.$$

20. The image pickup optical lens assembly of claim 16, wherein $R_1$ is a curvature radius of the object-side surface of the first lens element, $R_2$ is a curvature radius of the image-side surface of the first lens element, and the following relation is preferably satisfied:

$$-0.8<(R_1+R_2)/(R_1-R_2)<-0.2.$$

21. The image pickup optical lens assembly of claim 16, wherein the fourth lens element has positive refractive power, and the fifth lens element has negative refractive power.

22. The image pickup optical lens assembly of claim 21, wherein $T_{12}$ is the axial distance between the first lens element and the second lens element, $T_{23}$ is the axial distance between the second lens element and the third lens element, and the following relation is preferably satisfied:

$$0.39<T_{12}/T_{23}<1.25.$$

23. The image pickup optical lens assembly of claim 21, wherein f is the focal length of the image pickup optical lens assembly, $f_1$ is a focal length of the first lens element, and the following relation is satisfied:

$$0.95<f/f_1<1.40.$$

* * * * *

UNITED STATES PATENT AND TRADEMARK OFFICE
CERTIFICATE OF CORRECTION

PATENT NO. : 8,179,615 B1
APPLICATION NO. : 13/183000
DATED : May 15, 2012
INVENTOR(S) : Hsiang-Chi Tang and Hsin-Hsuan Huang Page 1 of 1

It is certified that error appears in the above-identified patent and that said Letters Patent is hereby corrected as shown below:

In column 4, line 50, equation 11, replace "| f/f$_4$ | + | f/f$_5$" with "| f/f$_4$ | + | f/f$_5$|."

In column 5, equation 8, replace "| f/f$_4$ | + | f/f$_5$" with "| f/f$_4$ | + | f/f$_5$ |."

In column 11, line 50, replace "| f/f$_4$ | + | f/f$_5$" with "| f/f$_4$ | + | f/f$_5$ |."

In column 25, line 34, replace "| f/f4 | + | f/f$_5$ |" with "| f/f$_4$ | + | f/f$_5$ |."

Signed and Sealed this
Twenty-fifth Day of September, 2012

David J. Kappos
*Director of the United States Patent and Trademark Office*